US010733282B2

(12) United States Patent
Shionozaki

(10) Patent No.: US 10,733,282 B2
(45) Date of Patent: Aug. 4, 2020

(54) INFORMATION PROCESSING SYSTEM, INFORMATION PROCESSING DEVICE, CONTROL METHOD, AND STORAGE MEDIUM

(71) Applicant: SONY CORPORATION, Tokyo (JP)

(72) Inventor: Atsushi Shionozaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 71 days.

(21) Appl. No.: 15/546,450

(22) PCT Filed: Nov. 17, 2015

(86) PCT No.: PCT/JP2015/082269
§ 371 (c)(1),
(2) Date: Jul. 26, 2017

(87) PCT Pub. No.: WO2016/129159
PCT Pub. Date: Aug. 18, 2016

(65) Prior Publication Data
US 2018/0025144 A1 Jan. 25, 2018

(30) Foreign Application Priority Data
Feb. 13, 2015 (JP) ................................ 2015-026239

(51) Int. Cl.
*G11C 7/00* (2006.01)
*G06F 17/00* (2019.01)
(Continued)

(52) U.S. Cl.
CPC ................ *G06F 21/33* (2013.01); *G06F 3/01* (2013.01); *G06F 3/011* (2013.01); *G06F 3/0304* (2013.01);
(Continued)

(58) Field of Classification Search
CPC ...... G06F 21/33; G06F 16/90335; G06F 3/01; G06F 21/316; G06Q 50/00
(Continued)

(56) References Cited

U.S. PATENT DOCUMENTS 7,249,263 B2 * 7/2007 Chaudhari .............. G06F 21/32
713/184
9,251,405 B2 * 2/2016 Bathiche ............ G06K 9/00335
(Continued)

FOREIGN PATENT DOCUMENTS

JP 2005-339368 A 8/2005
JP 2005-260944 A 9/2005
(Continued)

OTHER PUBLICATIONS

Manik Lal Das; Two-Factor User Authentication in Wireless Sensor Networks; IEEE Transactions on Wireless Communications, vol. 8, No. 3, Mar. 2009; p. 1086-1090 (Year: 2009).*
(Continued)

*Primary Examiner* — Monjur Rahim
(74) *Attorney, Agent, or Firm* — Chip Law Group

(57) ABSTRACT

An information processing system including a communication unit that acquires information related to an interaction between objects from a sensing device that detects the interaction between the objects, an emotion information database constructed by accumulating an evaluation value used when an emotion value of each object generated based on the information related to the interaction between the objects is calculated, a certification unit that certifies the sensing device and issues certification information to the sensing device, and an authentication unit that authenticates the information related to the interaction transmitted from the sensing device based on the certification information issued to the sensing device.

16 Claims, 19 Drawing Sheets

(51) Int. Cl.

| | | |
|---|---|---|
| *G06F 12/14* | (2006.01) | |
| *G06F 12/00* | (2006.01) | |
| *G06F 7/04* | (2006.01) | |
| *G06F 21/33* | (2013.01) | |
| *G06F 16/903* | (2019.01) | |
| *G06F 3/01* | (2006.01) | |
| *G06Q 30/02* | (2012.01) | |
| *G06F 3/03* | (2006.01) | |
| *G06F 21/31* | (2013.01) | |

(52) U.S. Cl.
CPC ...... *G06F 16/90335* (2019.01); *G06F 21/316* (2013.01); *G06Q 30/0255* (2013.01); *G06Q 30/0261* (2013.01); *G06Q 30/0269* (2013.01); *G06F 2203/011* (2013.01)

(58) Field of Classification Search
USPC .......................................................... 726/19
See application file for complete search history.

(56) References Cited

U.S. PATENT DOCUMENTS

| | | | | |
|---|---|---|---|---|
| 9,323,982 | B2* | 4/2016 | Kim ........................ | G06F 21/32 |
| 2002/0056043 | A1* | 5/2002 | Glass ...................... | G06F 21/32 |
| | | | | 713/179 |
| 2005/0022034 | A1* | 1/2005 | Chaudhari .............. | G06F 21/32 |
| | | | | 726/19 |
| 2006/0115157 | A1* | 6/2006 | Mori .................. | G06K 9/00221 |
| | | | | 382/190 |
| 2008/0276092 | A1* | 11/2008 | Eberhardt ............. | H04L 9/3236 |
| | | | | 713/175 |
| 2012/0170818 | A1* | 7/2012 | Hirai ....................... | G06F 21/32 |
| | | | | 382/118 |
| 2012/0311032 | A1* | 12/2012 | Murphy .............. | G07F 17/3225 |
| | | | | 709/204 |
| 2013/0219480 | A1* | 8/2013 | Bud ........................ | G06F 21/32 |
| | | | | 726/7 |
| 2013/0246800 | A1* | 9/2013 | Stewart ................... | G06F 21/32 |
| | | | | 713/176 |
| 2014/0254939 | A1* | 9/2014 | Kimura .............. | H04N 5/23219 |
| | | | | 382/201 |
| 2015/0356349 | A1* | 12/2015 | Govindarajeswaran ...................... | |
| | | | | G06K 9/00308 |
| | | | | 382/103 |

FOREIGN PATENT DOCUMENTS

| | | |
|---|---|---|
| JP | 2005-339368 A | 12/2005 |
| JP | 2005-339395 A | 12/2005 |
| JP | 2008-015585 A | 1/2008 |
| JP | 2012-164109 A | 8/2012 |
| TW | 201503745 A | 1/2015 |
| WO | 2015/001657 A1 | 1/2015 |

OTHER PUBLICATIONS

Miyake, et al., "Sensor Joho Network ni Okeru privacy Joho O Hogo suru Tameno Shushu Data Angoka Shuho to sono Kagi Haifu Hoshiki no Teian", Computer Security Symposium 2002, ISSN 1344-1640, vol. 2002, No. 16, Oct. 30, 2002, pp. 361-366.

International Search Report and Written Opinion of PCT Application No. PCT/JP2015/082269, dated Feb. 16, 2016, 02 pages of English Translation and 08 pages of ISRWO.

Miyake, et al., "Proposal of privacy data encryption scheme and key distribution method for sensor Information networks", Computer Security Symposium 2002, vol. 2002, No. 16, Oct. 30, 2002, pp. 361-366.

Miyake, et al., "Proposal of Privacy Data Encryption Scheme and Key Distribution Method for Sensor Information Networks", IPSJ Symposium Series vol. 2002, No. 16, Computer Security Symposium 2002, pp. 361-366.

Office Action for JP Patent Application No. 2016-574625, dated Dec. 17, 2019, 9 pages of Office Action and 12 pages of English Translation.

Miyake, et al., "Proposal of Privacy Data Encryption Scheme and Key Distribution Method for Sensor Information Networks", Computer Security Symposium 2002, Information Processing Society of Japan, vol. 2002, No. 16, Oct. 30, 2002, pp. 361-366.(Translation of abstract only).

Office Action for CN Patent Application No. 201580075266.5, dated Dec. 25, 2019, 05 pages of Office Action and 08 pages of English Translation.

Miyake, et al., "Proposal of encryption method of collected data and key distribution method thereof for protecting privacy information in sensor information network", Computer Security Symposium 2002, Information Processing Society of Japan, vol. 2002, No. 16, Oct. 30, 2002, pp. 361-366.(Translation of abstract only).

* cited by examiner

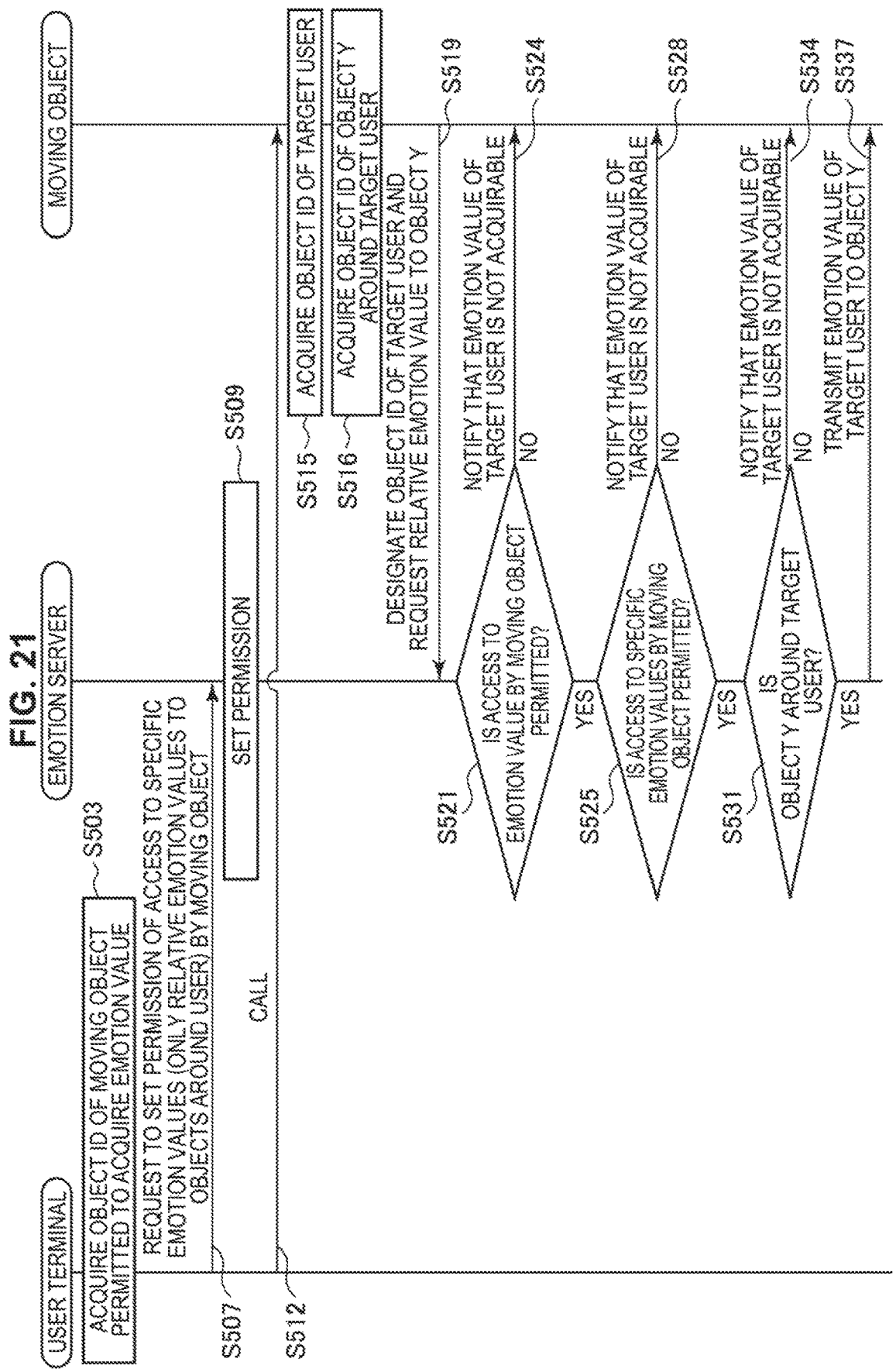

INFORMATION PROCESSING SYSTEM, INFORMATION PROCESSING DEVICE, CONTROL METHOD, AND STORAGE MEDIUM

CROSS REFERENCE TO RELATED APPLICATIONS

This application is a U.S. National Phase of International Patent Application No. PCT/JP2015/082269 filed on Nov. 17, 2015, which claims priority benefit of Japanese Patent Application No. JP 2015-026239 filed in the Japan Patent Office on Feb. 13, 2015. Each of the above-referenced applications is hereby incorporated herein by reference in its entirety.

TECHNICAL FIELD

The present disclosure relates to an information processing system, an information processing device, a control method, and a storage medium.

BACKGROUND ART

In the related art, the following technologies for reliability of constructed databases have been proposed.

For example, the following Patent Literature 1 discloses a system in which a user can input his or her emotion directly or input his or her emotion in accordance with a manipulation such as clicking of a mouse, and thus a change in an emotion of the user can be ascertained in accordance with certainty based on the time from the input.

In addition, the following Patent Literature 2 discloses a system capable of maintaining privacy by enabling a patient to set an off-record mode and improving reliability of an entire communication record system in a system in which conversation between a doctor and a patient is recorded.

CITATION LIST

Patent Literature

Patent Literature 1: JP 2005-339368A
Patent Literature 2: JP 2005-260944A

DISCLOSURE OF INVENTION

Technical Problem

However, technologies of the related art have not mentioned maintenance of reliability of an emotion value which is a new index objectively indicating an emotion, a thought, a value, reliability, humanity, or the like of an object generated on the basis of a history of an interaction occurring between objects including all articles and people.

Accordingly, the present disclosure proposes an information processing system, an information processing device, a control method, and a storage medium capable of maintaining or improving reliability of an emotion value.

Solution to Problem

According to the present disclosure, there is proposed an information processing system including: a communication unit configured to acquire information related to an interaction between objects from a sensing device that detects the interaction between the objects; an emotion information database constructed by accumulating an evaluation value used when an emotion value of each object generated on the basis of the information related to the interaction between the objects is calculated; a certification unit configured to certify the sensing device that detects the interaction between the objects and issue certification information to the sensing device; and an authentication unit configured to authenticate the information related to the interaction transmitted from the sensing device on the basis of the certification information issued to the sensing device.

According to the present disclosure, there is proposed an information processing device including: an extraction unit configured to extract information related to an interaction between objects detected by a sensor in connection with each object; a communication unit configured to transmit information regarding the sensor and the information related to the interaction detected by the sensor to a server including an emotion information database constructed by accumulating an evaluation value used when an emotion value of each object generated on the basis of the information related to the interaction between the objects is calculated; and a certification information storage unit configured to receive certification information indicating a result obtained when the server certifies an information processing device including the sensor on the basis of the information related to the interaction detected by the sensor via the communication unit, and store the certification information.

According to the present disclosure, there is proposed a control method including: acquiring information related to an interaction between objects from a sensing device that detects the interaction between the objects; constructing an emotion information database by accumulating an evaluation value used when an emotion value of each object generated on the basis of the information related to the interaction between the objects is calculated; certifying, by a certification unit, the sensing device that detects the interaction between the objects and issuing certification information to the sensing device; and authenticating, by an authentication unit, the information related to the interaction transmitted from the sensing device on the basis of the certification information issued to the sensing device.

According to the present disclosure, there is proposed a storage medium having a program stored therein, the program causing a computer to function as: an extraction unit configured to extract information related to an interaction between objects detected by a sensor in connection with each object; a communication unit configured to transmit information regarding the sensor and the information related to the interaction detected by the sensor to a server including an emotion information database constructed by accumulating an evaluation value used when an emotion value of each object generated on the basis of the information related to the interaction between the objects is calculated; and a certification information storage unit configured to receive certification information indicating a result obtained when the server certifies an information processing device including the sensor on the basis of the information related to the interaction detected by the sensor via the communication unit, and store the certification information.

Advantageous Effects of Invention

According to the present disclosure, as described above, it is possible to maintain or improve reliability of an emotion value.

Note that the effects described above are not necessarily limitative. With or in the place of the above effects, there

BRIEF DESCRIPTION OF DRAWINGS

FIG. 21 is a sequence diagram illustrating another access approval process according to the embodiment.

MODE(S) FOR CARRYING OUT THE INVENTION

Figure 1:
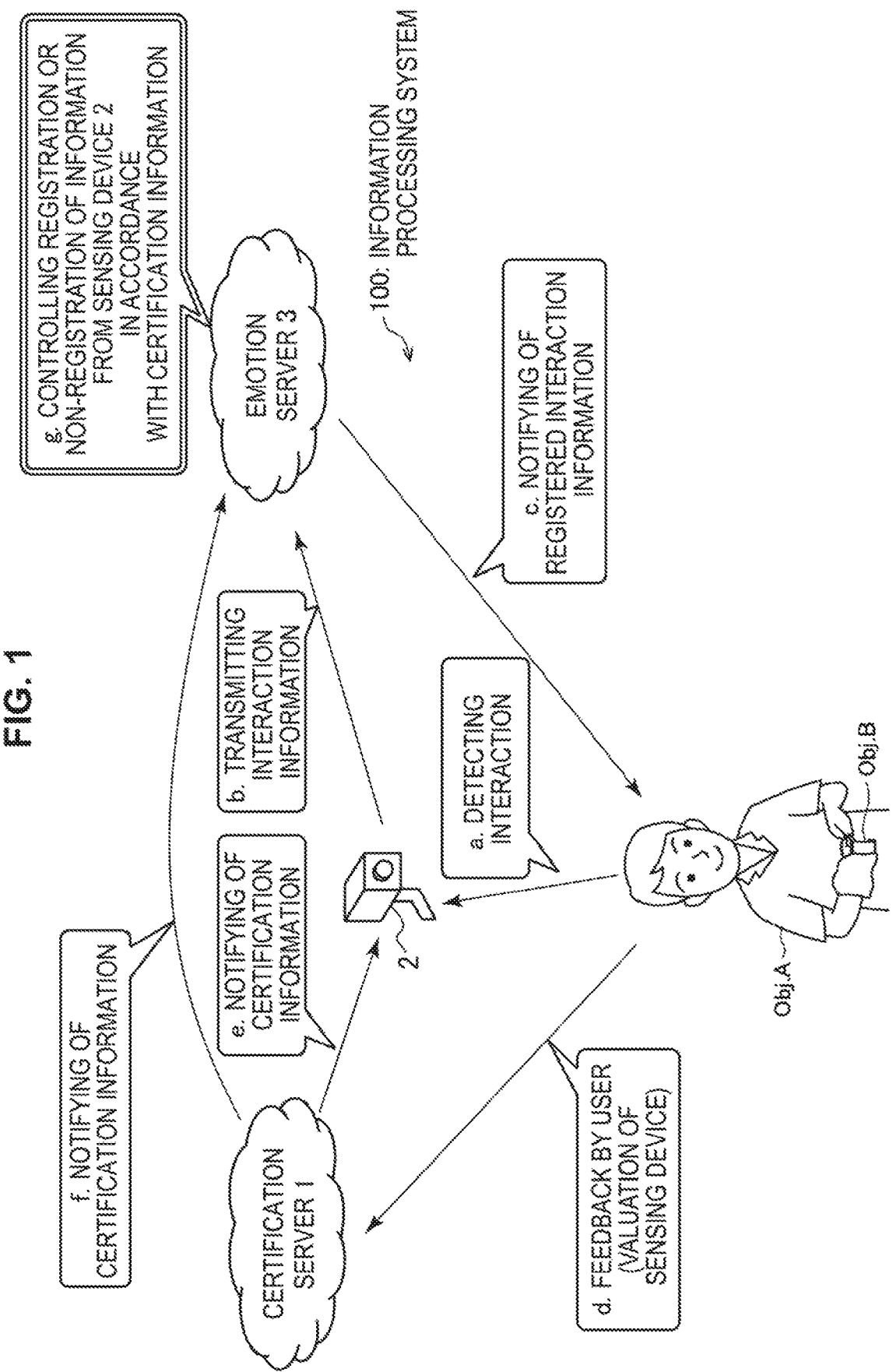
FIG. 1 is an explanatory diagram illustrating an overview of an information processing system according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

The description will be made in the following order.
1. Overview of information processing system according to embodiment of the present disclosure
2. Configuration
2-1. Entire configuration
2-2. Configuration of certification server
2-3. Configuration of sensing device
2-4. Configuration of emotion server
3. Operation process
3-1. Certification process for new sensing device
3-2. Periodic certification process for sensing device
3-3. Certification process in accordance with feedback
3-4. Certification process based on interaction evaluation value
3-5. Approval process
3-6. Access approval process
4. Conclusion

1. OVERVIEW OF INFORMATION PROCESSING SYSTEM ACCORDING TO EMBODIMENT OF THE PRESENT DISCLOSURE

First, an overview of an information processing system according to an embodiment of the present disclosure will be described with reference to FIG. 1. An information processing system 100 according to the embodiment includes a sensing device 2 that detects an interaction occurring between objects, a certification server 1, and an emotion server 3, as illustrated in FIG. 1, and maintains or improves reliability of an emotion value of an object calculated on the basis of interaction information detected by the sensing device 2.

Specifically, first, an interaction between a plurality of objects, for example, an interaction occurring between a user Obj.A (which is an example of an object) and a watch Obj.B (which is an example of an object) illustrated in FIG. 1 (that is, maintenance of a watch), is detected by the sensing device 2 (a: detecting an interaction). Here, in the example illustrated in FIG. 1, a state in which the sensing device 2 is installed around the object is illustrated, but the embodiment is not limited thereto. For example, the sensing device 2 may be mounted/loaded on the object or may be loaded on an information processing terminal worn by the object. In addition, the present disclosure is not limited to the case in which the sensing device 2 is realized by a camera capable of image analysis. For example, a vibration sensor, an acceleration sensor, a gyro sensor, a temperature sensor, a humidity sensor, an infrared sensor, a depth sensor, a tactile sensor, a biosensor, or a microphone may be used.

Subsequently, the sensing device 2 extracts information related to an interaction (hereinafter also referred to as interaction information) on the basis of detected sensing data and transmits the information to the emotion server 3 (b: transmitting the interaction information). For example, the sensing device 2 extracts interaction information "User Obj.A performs maintenance on the watch Obj.B/at 00:00 0 on month day" and transmits the interaction information to the emotion server 3.

The emotion server 3 registers the interaction information between the objects transmitted from the sensing device 2 (stores the interaction information in a database) and calculates emotion values of the objects on the basis of the accumulated interaction information (also referred to as a history of the interaction information). For example, when the object is a person, the emotion value calculated by the emotion server 3 is used as a new index objectively indicating personality or humanity of the person (for example, whether the person is reliable or rude) or a thought of the person for a specific object (for example, the person values the object or thinks that the object is valuable). Specifically, for example, the emotion value is used as credit information of a target person, an exhibitor, or a buyer in a personal credit information provision system or an auction system. The emotion value is used to ascertain humanity or reliability of a communication partner at the time of setting a privacy level in a telepresence system. In addition, in an environment adjustment system in which a surrounding environment of a target user is locally changed (for example, rain or sunshine is prevented from falling on a user) by a moving object such as a drone, the emotion value is used when an article carried by the user or a mood of the user with respect to a person staying together is ascertained and a coverage range is controlled.

In addition, when the object is an article, the emotion value is used as a new index objectively indicating a "thought" about receiving an article, such as that the article has been treated with care or treated recklessly until now. For example, the emotion value is used as a connotative value of an exhibited item in an auction system.

To maintain or improve reliability of the emotion value used in various systems, first, it is necessary that interaction information registered in a database constructed in the emotion server 3 be correct. For example, when the same interaction information is transmitted to the emotion server 3 several times, precision of a sensor or extraction precision of an interaction is lowered, or a different interaction from an actual interaction is extracted due to an erroneous operation of the sensing device 2, an accurate emotion value is not calculated and reliability of the entire system is lowered.

Accordingly, in view of the foregoing circumstances, by certifying the sensing device 2 that detects an interaction in the information processing system according to the present disclosure, it is possible to maintain or improve the reliability of the emotion value.

More specifically, as illustrated in FIG. 1, the information processing system 100 according to the embodiment is configured such that the user Obj.A can be notified of information on an interaction occurring between the user Obj.A and the watch Obj.B registered in the emotion server 3 and it can be confirmed whether the interaction information is correctly registered (c: notifying of the registered interaction information).

The user confirms whether the registered interaction information is correct and feeds evaluation of the sensing device 2 extracting the interaction information back to the certification server 1 (d: feedback by the user). The certification server 1 certifies the sensing device 2 on the basis of the feedback (the evaluation of the sensing device 2) from the user.

Then, the certification server 1 transmits certification information indicating a certification result (certification OK/NG) to the sensing device 2 and the emotion server 3 (e: notifying of the certification result and f: notifying of the certification result). The emotion server 3 controls registration or non-registration of the interaction information transmitted from the sensing device 2 in the database on the basis of the certification information (g: controlling registration or non-registration). That is, when the sensing device 2 is certified, the emotion server 3 registers the interaction information. When the certification is rejected, the emotion server 3 performs control such that the interaction information is discarded and not registered.

The overview of the information processing system according to the embodiment of the present disclosure has been described above. Next, the information processing system according to the present disclosure will be described specifically.

2. CONFIGURATION

2-1. Entire Configuration

Figure 2:
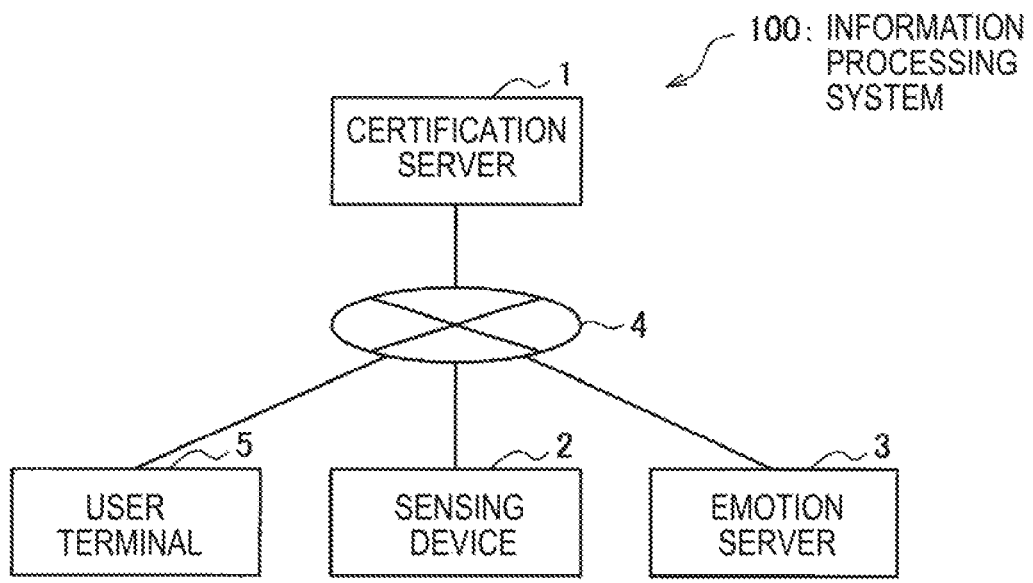
FIG. 2 is a diagram illustrating the configuration of the entire information processing system according to the embodiment.

FIG. 2 is a diagram illustrating the configuration of the entire information processing system according to the embodiment of the present disclosure. As illustrated in FIG. 2, the information processing system 100 includes the certification server 1, the sensing device 2, the emotion server 3, and a user terminal 5. The certification server 1, the sensing device 2, the emotion server 3, and the user terminal 5 can be connected via a network 4.

As described above, the sensing device 2 extracts an interaction between objects and transmits the interaction to the emotion server 3.

The emotion server 3 registers the interaction transmitted from the sensing device 2. In addition, the emotion server 3 transmits information regarding the registered interaction to the user terminal 5. In addition, the emotion server 3 can determine registration or non-registration of the interaction transmitted from the sensing device 2 on the basis of a certification result from the certification server 1.

The user terminal 5 displays the interaction information transmitted from the emotion server 3 and prompts the user to confirm the interaction information. In addition, the user terminal 5 transmits evaluation content input by the user to the certification server 1. Also, the user terminal 5 may be, for example, a smartphone, a mobile phone terminal, a personal computer, or a wearable terminal.

The certification server 1 certifies the sensing device 2 in accordance with the evaluation content from the user terminal 5 and transmits a certification result to the sensing device 2 and the emotion server 3. In addition, the certification server 1 can also determine the certification of the sensing device 2 in advance on the basis of device information or the like regarding the sensing device 2.

Hereinafter, each device included in the information processing system 100 will be described specifically.

2-2. Configuration of Certification Server

Figure 3:
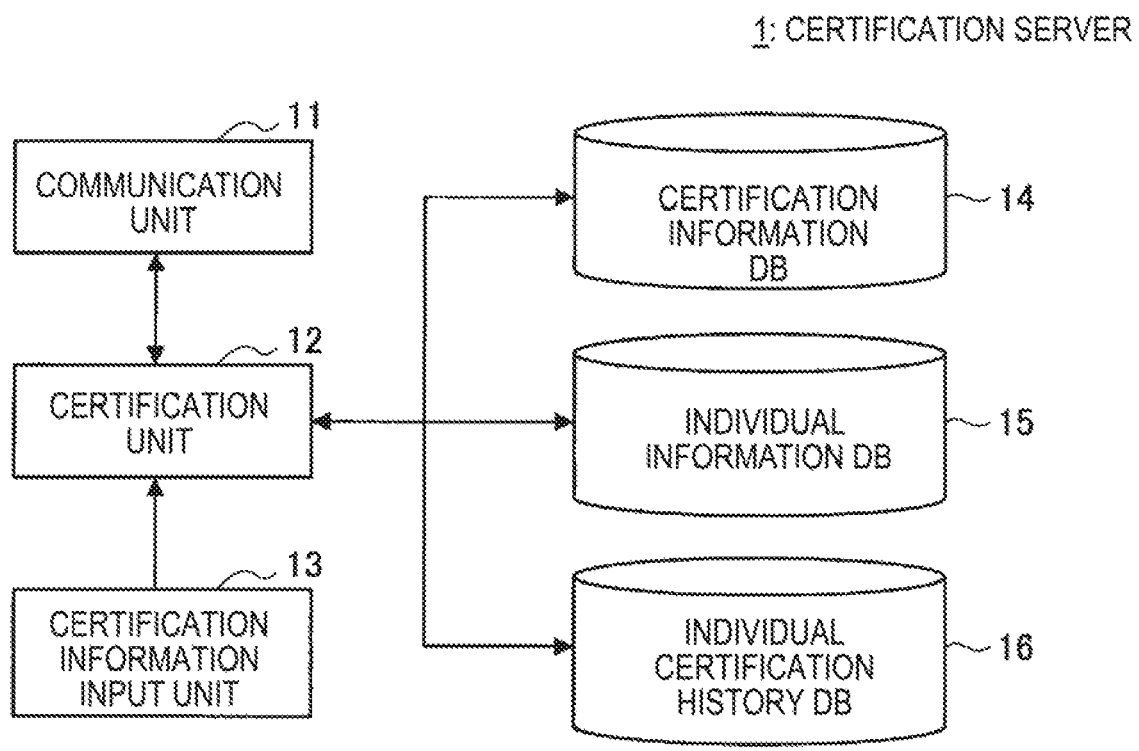
FIG. 3 is a diagram illustrating an example of the configuration of a certification server according to the embodiment.

FIG. 3 is a diagram illustrating an example of the configuration of the certification server 1 according to the embodiment. As illustrated in FIG. 3, the certification server 1 includes a communication unit 11, a certification unit 12, a certification information input unit 13, a certification information DB 14, an individual information DB 15, and an individual certification history DB 16.

The communication unit 11 exchanges information with an external device via the network 4. For example, the communication unit 11 receives sensing device individual information from the sensing device 2 or receives feedback information of the sensing device 2 from the user terminal 5. In addition, the communication unit 11 transmits certification information regarding the sensing device 2 to the sensing device 2 and the emotion server 3.

The certification unit 12 certifies the sensing device 2 and issues certification information to the sensing device 2 and the emotion server 3. Specifically, the certification unit 12 certifies the sensing device 2 on the basis of the feedback information received from the user terminal 5. In addition, the certification unit 12 stores the certification information in the individual certification history DB 16. When the certification unit 12 performs certification on the basis of new feedback information, the certification unit 12 updates corresponding existing certification information. In addition, the certification unit 12 can also certify the sensing device 2 with reference to a certification standard on the basis of the device information (property information indicating a function, performance, or the like) acquired from the sensing device 2. The certification process by the certification unit 12 will be described in detail with reference to FIGS. 6 to 12.

The certification information input unit 13 inputs information regarding the certification, such as the certification standard or model information regarding the sensing device 2 to be certified. The above-described certification unit 12 certifies the sensing device 2 using the certification standard input from the certification information input unit 13. In addition, the information regarding the certification input from the certification information input unit 13 is stored in the certification information DB 14. In addition, the certification information input unit 13 may be realized by a manipulation input unit (a keyboard, a mouse, a touch panel, or the like) accepting an input by a system manager or the like or may be realized by a reception unit that communicates with an external terminal and accepts an input of the certification information.

The certification information DB 14 is a storage unit that stores the certification standard and the model information regarding the certification target sensing device 2. For example, as the certification standard, data indicating "face recognition frame rate: 15 fps or more and average face recognition ratio: 50%" is stored. In addition, general item information (an item name, a model, a manufacturer, or the like) regarding the sensing device 2 to which the certification standard is applied or an individual ID of the sensing device 2 managed in the information processing system 100 can also be stored. In addition, a certification state (certified/certification rejected) by a model is also stored.

The individual information DB 15 is a storage unit that stores unique individual information regarding the sensing device 2. For example, an individual number (a serial number or the like) of the sensing device 2, corresponding model information, a model ID managed in the information processing system 100, an individual ID, an individual certification state (certified/certification rejected), an introduction state in the information processing system 100 (introduced/unintroduced), authentication key information, and the like are stored.

The individual certification history DB 16 is a storage unit that stores an individual certification history of the sensing device 2. For example, a certification information history (a date, the certification standard, and a certification result) of an individual or a feedback history (a date, a user evaluation value, and a certification result) of a user is stored in association with the individual ID of the sensing device 2. For example, a data example of the individual certification information history is shown in the following Table 1 and a data example of the feedback history of a user is shown in the following Table 2.

TABLE 1

| Individual ID | Date | Certification standard | Certification result |
|---|---|---|---|
| 56789 | Nov. 1, 2014 15:00:00 | frame rate = 10.0 | Average recognition accuracy = 0.93 OK |

TABLE 2

| Individual ID | Date | User evaluation (1-10) | Certification result |
|---|---|---|---|
| 56789 | Dec. 1, 2014 15:00:00 | 8 | OK |

In the above-described certification server 1, a microcomputer that includes a central processing unit (CPU), a read-only memory (ROM), a random access memory (RAM), and a nonvolatile memory is loaded to control each configuration of the certification server 1.

2-3. Configuration of Sensing Device

Figure 4:
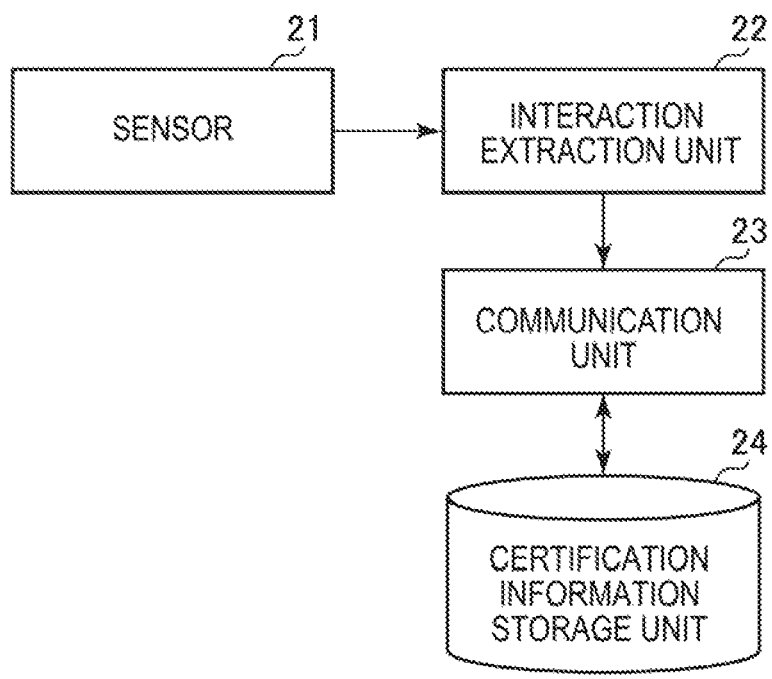
FIG. 4 is a diagram illustrating an example of the configuration of a sensing device according to the embodiment.

FIG. 4 is a diagram illustrating an example of the configuration of a sensing device 2 according to the embodiment. As illustrated in FIG. 4, the sensing device 2 includes a sensor 21, an interaction extraction unit 22, a communication unit 23, and a certification information storage unit 24.

(Sensor)

The sensor 21 has a function of detecting an interaction between objects. The sensor 21 is realized by, for example, a humidity sensor, a temperature sensor, a vibration sensor, an infrared sensor, a camera, a tactile sensor, a gyro sensor, an illuminance sensor, a human detection sensor, an atmospheric sensor (specifically, a dust sensor or a contaminant sensor), a speed sensor, or a number-of-times measurement value.

(Interaction Extraction Unit)

The interaction extraction unit 22 functions as a detection unit that analyzes sensing data output from the sensor 21 and detects information related to an interaction between first and second objects. For example, the interaction extraction unit 22 specifically extracts an interaction (conversation, telephony, or presentation) between people or an interaction between a person and an article (maintenance of an article, handling of an article, or a motion of a person on an article such as an action in a shop).

(Communication Unit)

The communication unit 23 transmits information related to the interaction extracted by the interaction extraction unit 22 to the emotion server 3 via the network 4. In addition, the communication unit 23 receives certification information from the certification server 1.

(Certification Information Storage Unit)

The certification information storage unit 24 stores the certification information transmitted from the certification server 1. The certification information includes a certification result obtained on the sensing device 2 by the certification server 1.

A microcomputer that includes a CPU, a ROM, a RAM, and a nonvolatile memory is loaded on the above-described sensing device 2 and controls each configuration of the sensing device 2.

2-4. Configuration of Emotion Server

Figure 5:
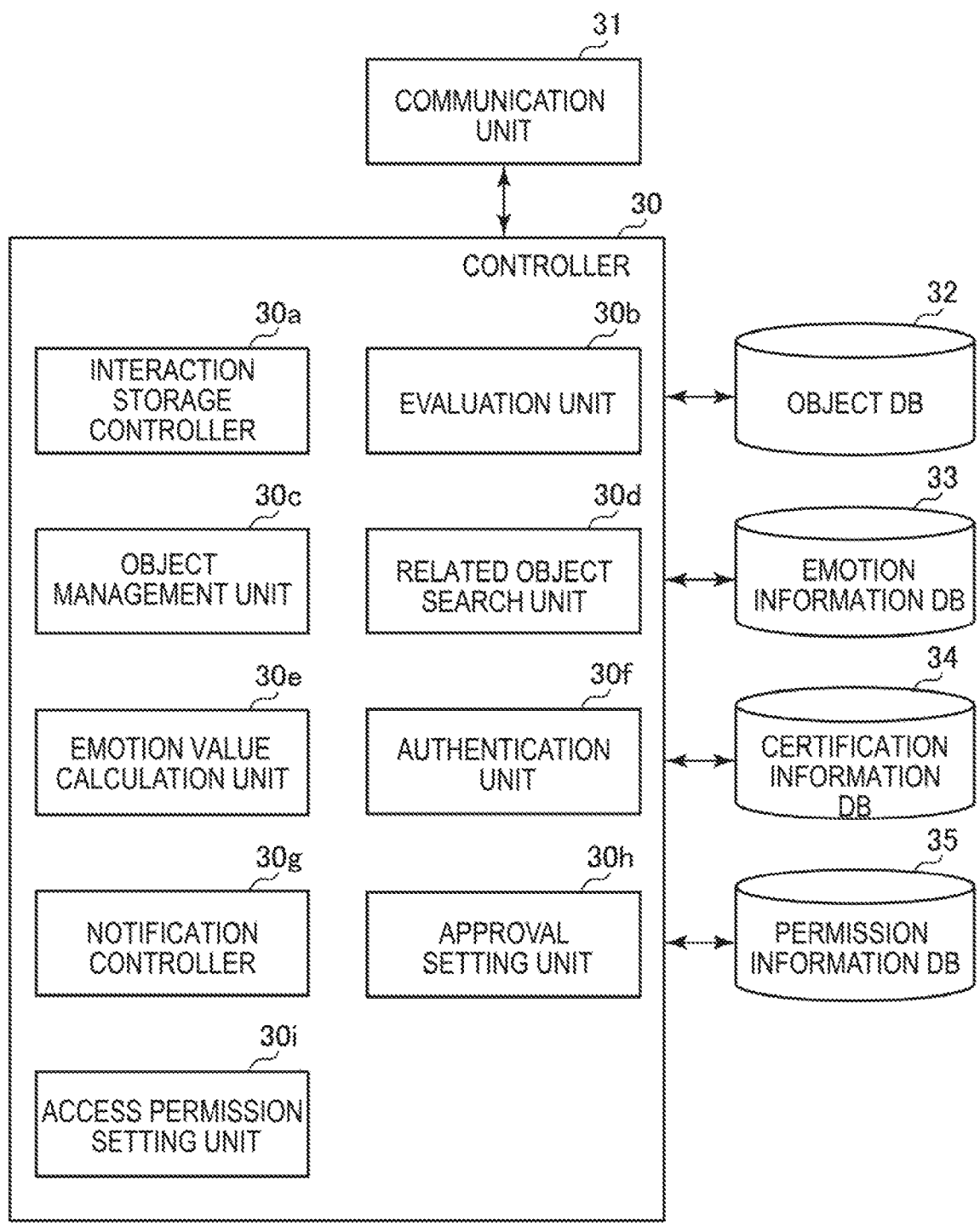
FIG. 5 is a diagram illustrating an example of the configuration of an emotion server according to the embodiment.

FIG. 5 is a diagram illustrating an example of the configuration of the emotion server 3 according to the embodiment. As illustrated in FIG. 5, the emotion server 3 includes a controller 30, a communication unit 31, an object DB 32, an emotion information DB 33, a certification information DB 34, and a permission information DB 35.

(Controller)

The controller 30 is configured with a microcomputer that includes a CPU, a ROM, a RAM, and a nonvolatile memory and controls each configuration of the emotion server 3. In addition, as illustrated in FIG. 5, the controller 30 functions as an interaction storage controller 30a, an evaluation unit 30b, an object management unit 30c, a related object search unit 30d, an emotion value calculation unit 30e, an authentication unit 30f, a notification controller 30g, an approval setting unit 30h, and an access permission setting unit 30i.

The interaction storage controller 30a performs control such that the interaction information received from the sensing device 2 is stored in the emotion information DB 33. In addition, the interaction storage controller 30a according to the embodiment performs control such that the interaction information authenticated by the authentication unit 30f to be described below is stored in the emotion information DB 33. In addition, the interaction storage controller 30a according to the embodiment may perform control such that an interaction of the object ID approved by the approval setting unit 30h to be described below or a type of approved interaction is stored in the emotion information DB 33.

The evaluation unit 30b evaluates the interaction stored in the emotion information DB 33. A method of evaluating the interaction (behavior) is not particularly limited. For example, the evaluation unit 30b may grant a score (evaluation value) of −1.0 to 1.0 on the basis of a standard decided with any evaluation index. The granted evaluation value is stored in the emotion information DB 33 in association with the interaction.

The object management unit 30c performs management such as registration, changing, and deletion of information regarding an object stored in the object DB 32 (for example, the object ID, name, and type).

The related object search unit 30d searches for a related object which is another object in which an interaction occurs with the object ID requested from an external device from an interaction history stored in the emotion information DB 33 and searches for information regarding the related object from the object DB 32.

The emotion value calculation unit 30e calculates an emotion value of the requested object on the basis of evaluations values in association with interactions accumulated in the emotion information DB 33. A method of calculating the emotion value is not particularly limited. For example, the emotion value calculation unit 20e may calculate an absolute emotion value of the requested object on the basis of a total value of all the interaction evaluation values occurring between the requested object and other objects. In addition, the emotion value calculation unit 20e may calculate the absolute emotion value of the requested object on the basis of an average value of all the interaction evaluation values. In addition, the emotion value calculation unit 20e can also perform weighting by the type of interaction and then calculate the absolute emotion value on the basis of the total value, the average value, or the like. Further, the emotion value calculation unit 20e may calculate a relative emotion value of the requested object on the basis of a total value, an average value, or the like of the interaction evaluation values occurring between the requested object and specific (or specific types of) objects. In addition, the emotion value calculation unit 20e may also select an interaction history to be used to calculate the emotion value in accordance with an emotion value use objective of a request source and calculate the emotion value of the requested object.

The authentication unit 30f has a function of authenticating storage (registration) of the information related to the interaction transmitted from the sensing device 2 in the certification information DB 34 on the basis of the certification information issued from the certification server 1. The certification information is stored in the certification information DB 34. Specifically, the authentication unit 30f authenticates the information related to the interaction transmitted from the sensing device 2 certified by the certification server 1. Conversely, the authentication unit 30f does not authenticate the information related to the interaction transmitted from the sensing device 2 not certified by the certification server 1 or the sensing device 2 of which the certification is rejected by the certification server 1 and does not register the information in the emotion information DB 33.

The notification controller 30g performs control such that a user is notified of information related to an interaction occurring between an object (user) and another object, extracted by the sensing device 2, and registered in the emotion information DB 33. Thus, the user can confirm whether the interaction occurring between the user and another object is correctly extracted and can feed evaluation for the sensing device 2 extracting the interaction back (to the certification server 1).

The approval setting unit 30h performs approval setting of detection/registration of an interaction occurring between a target object and another object. Specifically, for example, the approval setting unit 30h sets approval of the detection/registration of the interaction information for each object ID or type of interaction. Information regarding the approval setting is stored in the certification information DB 34. In addition, the specific sensing device 2 is notified of the information regarding the approval setting.

For example, when a user allows aspects of his or her daily life at home such as cleaning of a watch and a conversation with another person to be detected/registered as an interaction and desires to avoid detection/registration of facial expressions, the user can avoid the detection/registration not desired by the user by approving types of interactions of detection/registration OK or NG in advance. In this way, the detection/registration of the interaction according to the embodiment is not limited to the detection/registration of all the interactions in the emotion information DB 33 by the certified sensing device 2, but the object ID/type of interaction set to be approved can also be detected/registered.

In addition, for example, in a situation in which an interaction between objects which are within a specific range can be extracted by the sensing device 2 installed in a public place, registration or non-registration of an interaction in the public place can also be approved for each user (that is, each object ID). For example, in a conference room of a business office, a restaurant, an event site, or the like, a user entering that place can be notified of registration or non-registration of an interaction in that place and approval setting can be appropriately performed. An approval process by the approval setting unit 30h will be described in detail with reference to FIGS. 13 to 18.

The access permission setting unit 30i has a function of performing permission setting of access to an interaction evaluation value or an emotion value of the requested object ID from a third person. Specifically, the access permission setting unit 30i permits the access of the user to the interaction evaluation value or the emotion value to a specific third person (external device) in accordance with an instruction from the user. Information regarding the permission (permission information) is stored in the permission information DB 35. Thus, for example, the emotion value calculation unit 30e can prevent unauthorized access by determining whether an external device of a request source is permitted to access the emotion value or the interaction evaluation value of the user with reference to the permission information stored in the permission information DB 35. An access permission setting process by the access permission setting unit 30i will be described in detail with reference to FIGS. 19 to 21.

(Communication Unit)

The communication unit 31 receives the interaction information from the sensing device 2 via the network 4 and receives the certification information from the certification server 1. In addition, the communication unit 31 transmits the interaction information to the user terminal 5 via the network 4 in accordance with an instruction of the notification controller 30g.

In addition, the communication unit 31 transmits interaction evaluation stored in the emotion information DB 33 or an emotion value calculated by the emotion calculation unit 30e in accordance with a request from an external device.

(Object DB)

The object database (DB) 32 stores adjunctive information regarding each object, for example, a name (a personal name or an item name), a type (sex or category), identification information (a face image, biometric information, a serial number, a model, and a maker ID), in association with the object ID (including a person and an article).

(Emotion Information DB)

The emotion information DB 33 stores the interaction information between objects to be used to calculate an emotion value. The interaction information includes, for example, the object ID for which an interaction is performed/received, a date and a place in which the interaction occurs, the related object ID (that is, a partner of the interaction) related to the interaction, the type of interaction (conversation, telephony, mailing, maintenance, safekeeping, cleaning, discarding, purchase, donation, manipulation, use, or the like) related to the interaction, details of the interaction, and an evaluation value.

(Certification Information DB)

The certification information DB 34 stores certification information regarding the sensing device 2 issued from the certification server 1. The certification information includes, for example, the individual ID of the sensing device 2 and a certification result (certified/uncertified/certification rejected).

(Permission Information DB)

The permission information DB 35 stores permission information regarding access permission of the interaction evaluation value or the emotion value to a third person by the access permission setting unit 30i. The permission information includes, for example, the object ID of an access target and the object ID of a permitted third person.

The configuration of the emotion server 3 according to the embodiment has been described specifically above. Also, the configuration of the emotion server 3 is not limited to the example illustrated in FIG. 5 and may also be configured not to include the approval setting unit 30h or the access permission setting unit 30i. In addition, the object DB 32, the emotion information DB 33, the certification information DB 34, and the permission information DB 35 may be stored in an external storage device on a network.

3. OPERATION PROCESS

Next, an operation process according to the embodiment will be described specifically with reference to the flowcharts and the sequence diagrams.

3-1. Certification Process for New Sensing Device

In the embodiment, certification of a new sensing device can also be performed in advance in accordance with the certification standard. For example, certification is performed in accordance with whether the performance of the sensing device 2 is greater than a predetermined standard. Thus, it is possible to avoid unauthorized extraction of an interaction by the sensing device 2 and maintain reliability of the entire system. Hereinafter, the certification process for a new sensing device will be described with reference to FIGS. 6 and 7.

Figure 6:
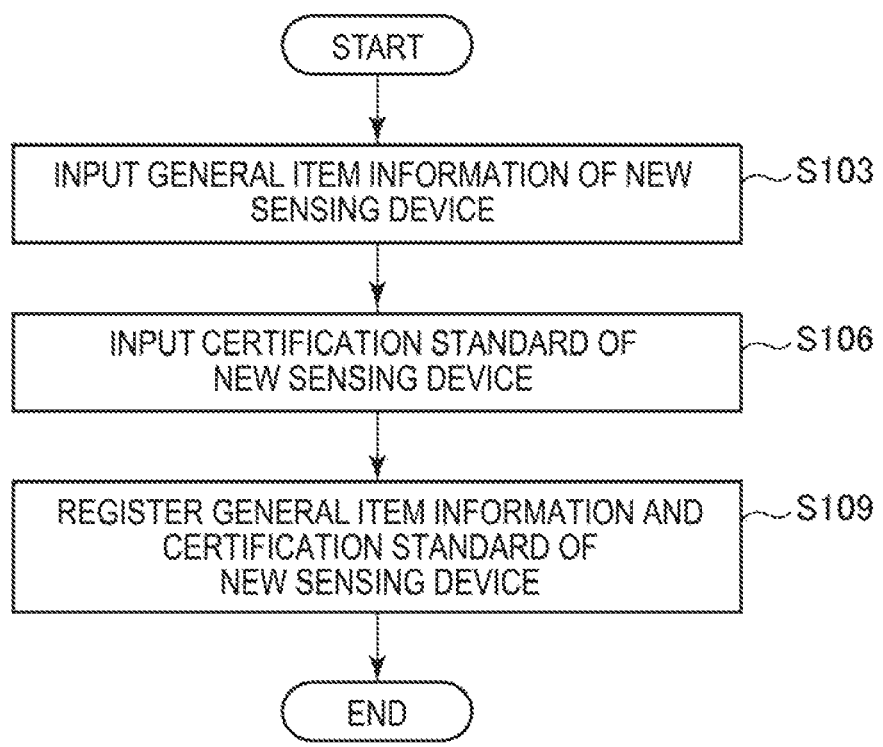
FIG. 6 is a flowchart illustrating a registration process for a new sensing device according to the embodiment.

FIG. 6 is a flowchart illustrating a registration process for a new sensing device according to the embodiment. When the new sensing device is introduced in the system, information regarding the new sensing device is registered in the certification server 1.

First, in step S103 illustrated in FIG. 6, the certification server 1 accepts an input of item information of the new sensing device. Specifically, general item information (the name, model, manufacturer, and the like of the item) of the new sensing device can be input from the certification information input unit 13 by a manager.

Next, in step S106, the certification server 1 accepts an input of the certification standard of the new sensing device. Specifically, the certification standard (a performance condition or the like necessary for certification) of the new sensing device can be input from the certification information input unit 13 by the manager.

Subsequently, in step S109, the certification server 1 stores the general item information and the certification standard of the input new sensing device in connection with each other in the certification information DB 14.

In this way, the general item information and the certification standard of the new sensing device introduced in the system are registered. Then, when the new sensing device 2 (individual) is actually installed, the certification server 1 certifies each sensing device 2. Hereinafter, the certification process for the sensing device 2 (individual) will be described with reference to FIG. 7.

Figure 7:
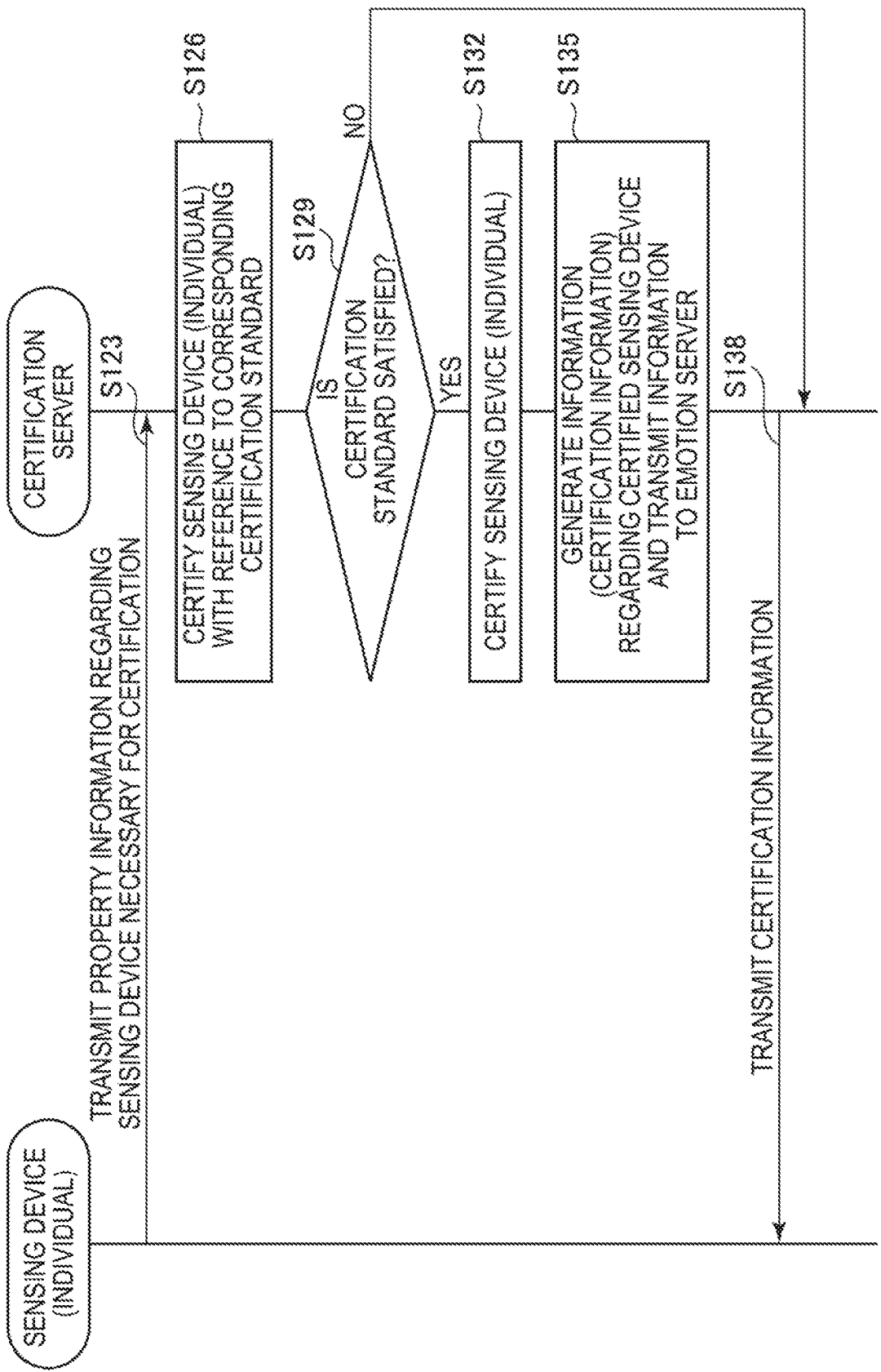
FIG. 7 is a sequence diagram illustrating a certification process for a sensing device individual according to the embodiment.

FIG. 7 is a sequence diagram illustrating a certification process for the sensing device individual according to the embodiment. As illustrated in FIG. 7, in step S123, the newly installed (or delivered) sensing device 2 (individual) first transmits property information (so-called performance information) regarding the sensing device 2 necessary for certification to the certification server 1.

Next, in step S126, the certification unit 12 of the certification server 1 extracts the corresponding certification standard registered in the certification information DB 14 on the basis of a model included in the property information received from the sensing device 2 via the communication unit 11 and certifies the sensing device (individual) on the basis of the certification standard.

Subsequently, when the certification standard is satisfied ("Yes" in S129), the certification unit 12 certifies the sensing device 2 (individual) in step S132. Specifically, the certification unit 12 stores the property information regarding the certified sensing device 2 (registers the certified device) in the individual information DB 15 and stores a certification history of the sensing device 2 in the individual certification history DB 16.

Subsequently, in step S135, the certification unit 12 generates information (certification information) regarding the certified sensing device 2 and transmits the information to the emotion server 3. The certification information transmitted to the emotion server 3 is stored in the certification information DB 34 of the emotion server 3.

In addition, in step S138, the certification unit 12 also transmits the certification information to the sensing device 2. The certification information transmitted to the sensing device 2 is stored in the certification information storage unit 24 of the sensing device 2.

Conversely, when the certification standard is not satisfied ("No" in S129), the certification unit 12 does not perform the certification.

The certification process at the time of installation (or the time of delivery) of the new sensing device has been described. In this way, in the embodiment, it is possible to certify the sensing device 2 in advance.

3-2. Periodic Certification Process for Sensing Device

In the above-described certification process, the fact that the certification process is performed at the time of installation of the new sensing device 2 has been described, but the embodiment is not limited thereto. For example, the information processing system 100 according to the embodiment can periodically acquire the property information from the sensing device 2, confirm the certification at that time, and reexamine the certification. For example, in an example of the sensing device extracting an interaction through analysis of a captured image, it is necessary to reexamine the certification due to a reduction in a frame rate of image capturing and analysis. Hereinafter, the periodic certification process will be described with reference to FIGS. 8 and 9.

Figure 8:
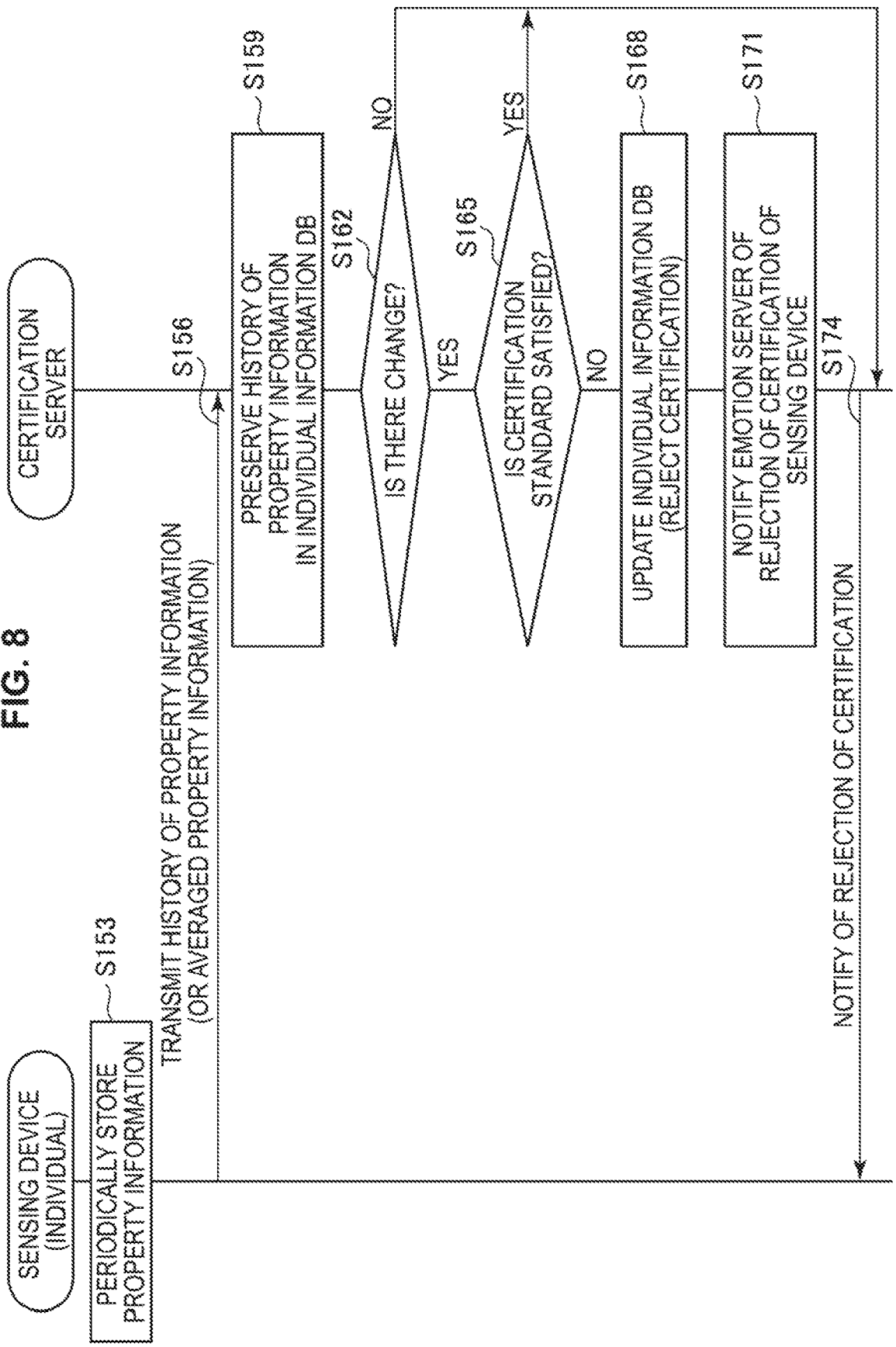
FIG. 8 is a sequence diagram illustrating a periodic certification process according to the embodiment.

FIG. 8 is a sequence diagram illustrating the periodic certification process according to the embodiment. As illustrated in FIG. 8, in step S153, the sensing device 2 (individual) first periodically stores the property information regarding the sensing device 2 necessary for certification.

Next, in step S156, the sensing device 2 transmits a history of the accumulated property information (or property information obtained by averaging histories) to the certification server 1.

Subsequently, in step S159, the certification unit 12 of the certification server 1 preserves the received history of the property information in the individual information DB 15.

Next, in step S162, the certification unit 12 compares the received property information to a previous property history to determine whether the property information is changed.

Subsequently, when the property information is changed ("Yes" in S162), the certification unit 12 determines whether the received property information satisfies the certification standard in step S165.

Subsequently, when the property information does not satisfy the certification standard ("No" in S165), the certification unit 12 rejects the certification of the sensing device 2 and updates a certification state of the sensing device 2 to be stored in the individual information DB 15 to "rejection of certification" in step S168.

Next, in step S171, the certification unit 12 notifies the emotion server 3 of the rejection of certification of the sensing device 2. The emotion server 3 stores information regarding the rejection of certification in the certification information DB 34. The interaction information transmitted from the sensing device 2 of which the certification is rejected is not authenticated by the authentication unit 30*f* and the emotion server 3 does not store (register) the interaction information in the emotion information DB 33, so that reliability of the emotion value (or the emotion information DB 33 storing an evaluation value which is a component of the emotion value) can be maintained.

In addition, in step S174, the certification unit 12 also transmits the rejection of certification to the sensing device 2. The sensing device 2 stores the information regarding the rejection of certification in the certification information storage unit 24. When the sensing device 2 receives the rejection of certification, the sensing device 2 can maintain reliability of a database (the emotion information DB 33) constructed on the side of the emotion server 3 by performing control such that the interaction is not extracted and transmitted to the emotion server 3.

The rejection of certification of the sensing device 2 (individual) has been described above. Also, when the certification of the sensing device 2 (individual) is rejected, the certification server 1 may notify a user of the rejection of certification to provide the user with an opportunity to determine registration or non-registration of the interaction. For example, the user may be notified of the rejection of certification using a mail address of the user registered in the individual information DB 15 as individual information regarding the sensing device 2 (individual).

In addition, when the individual certification is rejected in this way, the information processing system 100 according to the embodiment may further confirm the certification of the same model as the individual of which the certification is rejected. Hereinafter, the description will be made with reference to FIG. 9.

Figure 9:
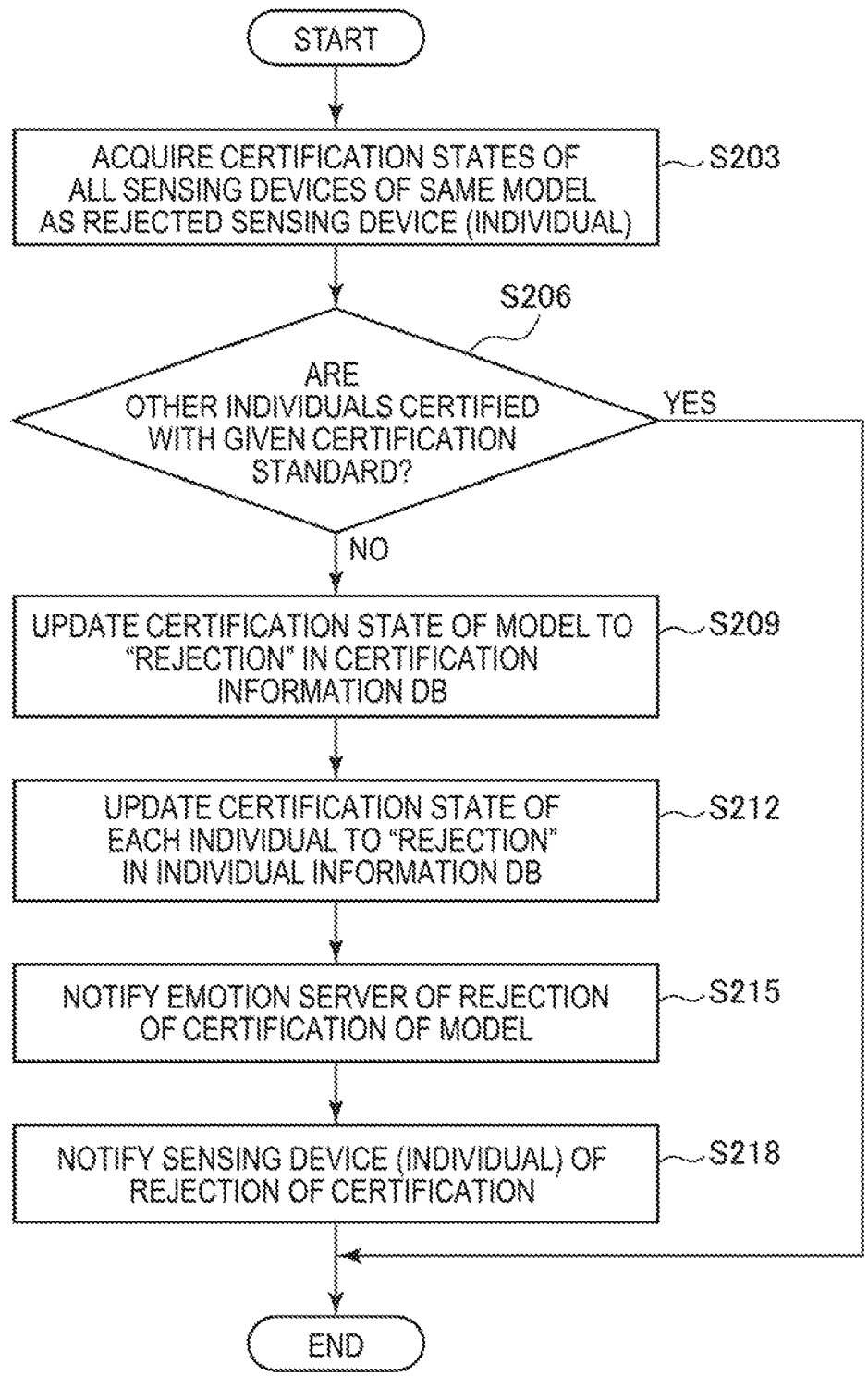
FIG. 9 is a flowchart illustrating a certification confirmation process when certification is rejected.

FIG. 9 is a flowchart illustrating a certification confirmation process when certification is rejected. As illustrated in FIG. 9, in step S203, the certification unit 12 of the certification server 1 first acquires certification states of all the sensing devices 2 of the same model as the rejected sensing device 2 (individual). Specifically, the certification unit 12 acquires certification information regarding the sensing devices 2 with the same model as a target from the individual information DB 15.

Next, in step S206, the certification unit 12 determines whether other individuals are also certified with a given certification standard.

Subsequently, when the other individuals with the same model are not certified either (No in S206), the certification unit 12 updates a certification state of the model of the target to "rejection of certification" in the certification information DB 14 in step S209. The reason for this update is to reject the certification of all the individuals of the model of the target since there is a possibility of a defect occurring in all the sensing devices 2 of the model when the certification of one or more of the individuals of the same model is rejected.

Next, in step S212, the certification unit 12 updates the certification state of each individual of the model of the target to "rejection of certification" in the individual information DB 15.

Subsequently, in step S215, the certification unit 12 notifies the emotion server 3 of the rejection of certification of the model of the target. The emotion server 3 stores the received information regarding the rejection of certification in the certification information DB 34. The interaction information transmitted from the sensing device 2 of the model of which the certification is rejected is not authenticated by the authentication unit 30*f* and the emotion server 3 does not store (register) the interaction information in the emotion information DB 33, so that reliability of the emotion value (or the emotion information DB 33 storing an evaluation value which is a component of the emotion value) can be maintained.

Then, in step S218, the certification unit 12 notifies each sensing device 2 of the model of the target of the rejection of certification of the model. The sensing device 2 stores the information regarding the rejection of certification in the certification information storage unit 24. When the sensing device 2 receives the rejection of certification, the sensing device 2 can maintain reliability of the database (the emotion information DB 33) constructed on the side of the emotion server 3 by performing control such that the interaction is not extracted and transmitted to the emotion server 3.

3-3. Certification Process in Accordance with Feedback

Figure 10:
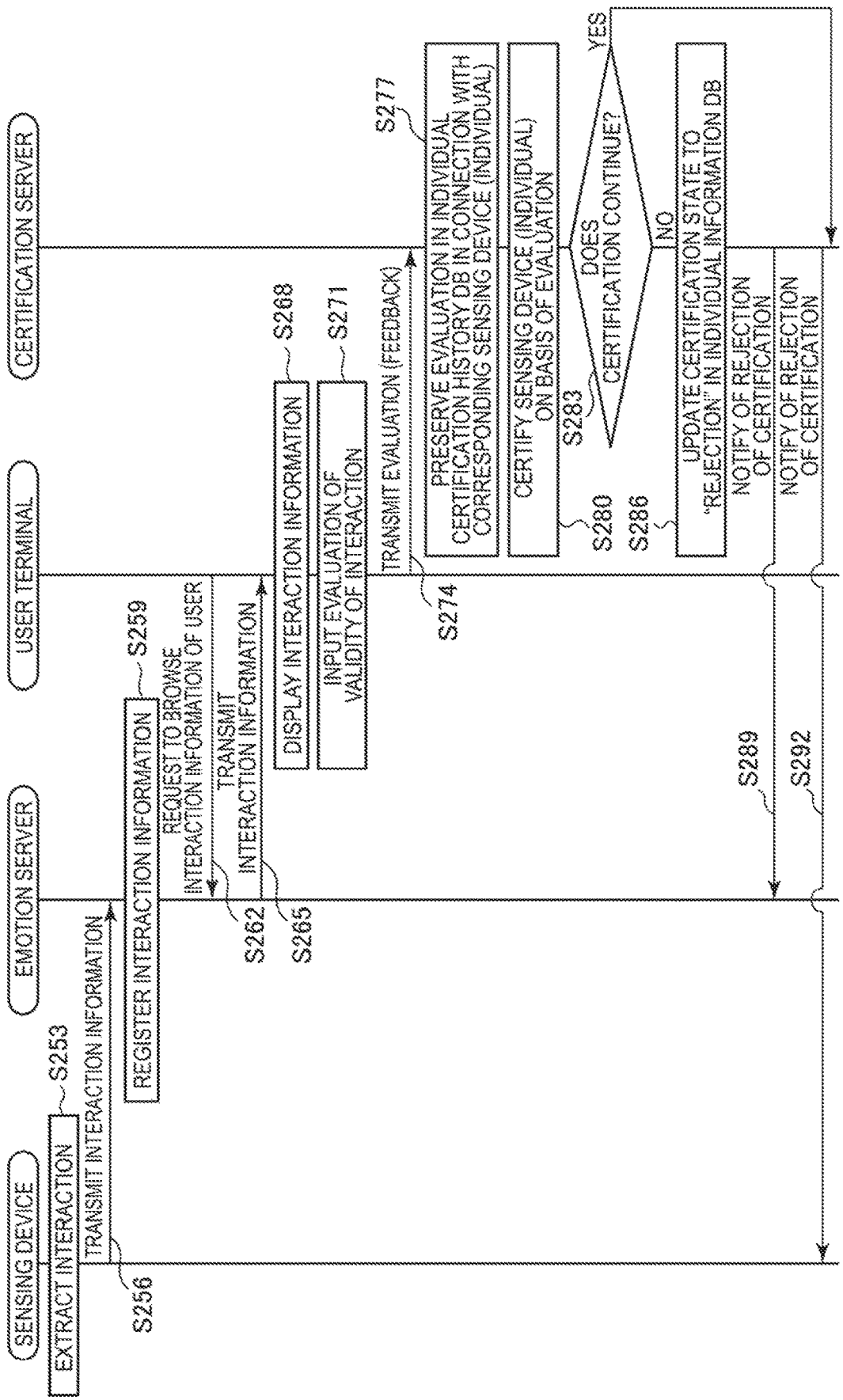
FIG. 10 is a sequence diagram illustrating a certification process for the sensing device in accordance with feedback of a user according to the embodiment.

Next, a certification process for the sensing device 2 in accordance with feedback from a user will be described with reference to FIG. 10. FIG. 10 is a sequence diagram illustrating the certification process for the sensing device in accordance with feedback of the user according to the embodiment.

As illustrated in FIG. 10, in step S253, the interaction extraction unit 22 of the sensing device 2 extracts an interaction on the basis of sensing data detected by the sensor 21.

Subsequently, in step S256, the communication unit 23 of the sensing device 2 transmits the interaction information to the emotion server 3.

Subsequently, in step S259, the interaction storage controller 30a of the emotion server 3 stores (registers) the received interaction information in the emotion information DB 33.

Subsequently, in step S262, the user terminal 5 requests the emotion server 3a to browse the interaction information regarding the user carrying the user terminal 5. The request for browsing the interaction information may be given automatically or in accordance with a user manipulation. In addition, when the user terminal 5 requests the emotion server 3 to browse the interaction information, the user terminal 5 designates an object ID of the user.

Subsequently, in step S265, the notification controller 30g of the emotion server 3 extracts the interaction information corresponding to the designated object ID of the user from the emotion information DB 33 and transmits the interaction information to the user terminal 5. Also, the interaction information includes identification information such as the individual ID of the sensing device 2 detecting the interaction.

Subsequently, in step S268, the user terminal 5 displays the received interaction information on a display unit (not illustrated).

Subsequently, in step S271, the user terminal 5 accepts an evaluation input (feedback input) of validity of the interaction by the user. Specifically, the user evaluates whether detection of the interaction by the sensing device 2 is normally performed. The evaluation may be made with indexes of 1 to 10, for example.

Subsequently, in step S274, the user terminal 5 transmits the input evaluation to the certification server 1 (feedback).

Subsequently, in step S277, the certification unit 12 of the certification server 1 preserves the evaluation received from the user terminal 5 via the communication unit 11 in the individual certification history DB 16 in connection with the corresponding sensing device 2 (individual).

Subsequently, in step S280, the certification unit 12 certifies the corresponding sensing device 2 (individual) on the basis of the evaluation from the user. For example, when the evaluation by the user is input with indexes of 1 to 10 and the evaluation is equal to or less than a predetermined value, the certification unit 12 rejects the certification.

Subsequently, when it is determined that the certification does not continue, that is, it is determined that the certification is rejected ("No" in S283), the certification unit 12 updates the certification state of the sensing device 2 (individual) corresponding to the individual certification history DB 16 to "rejection of certification" in step S286.

Subsequently, in step S289, the certification unit 12 notifies the emotion server 3 of the rejection of certification.

Then, in step S292, the certification unit 12 notifies the sensing device 2 of the rejection of certification.

Conversely, when it is determined that the certification continues ("Yes" in S283), the certification unit 12 does not change the certification state of the corresponding sensing device 2.

The certification process for the sensing device 2 in accordance with the feedback by the user has been described specifically above. Also, the same model of the sensing device 2 of which the certification is rejected in the certification process may similarly be subjected to the certification confirmation process illustrated in FIG. 9. In addition, in the above-described certification process, the user terminal 5 requests the emotion server 3 to browse the interaction information (see S262), but the embodiment is not limited thereto. For example, the emotion server 3 may request the user terminal 5 to evaluate the interaction information.

3-4. Certification Process Based on Interaction Evaluation Value

Figure 11:
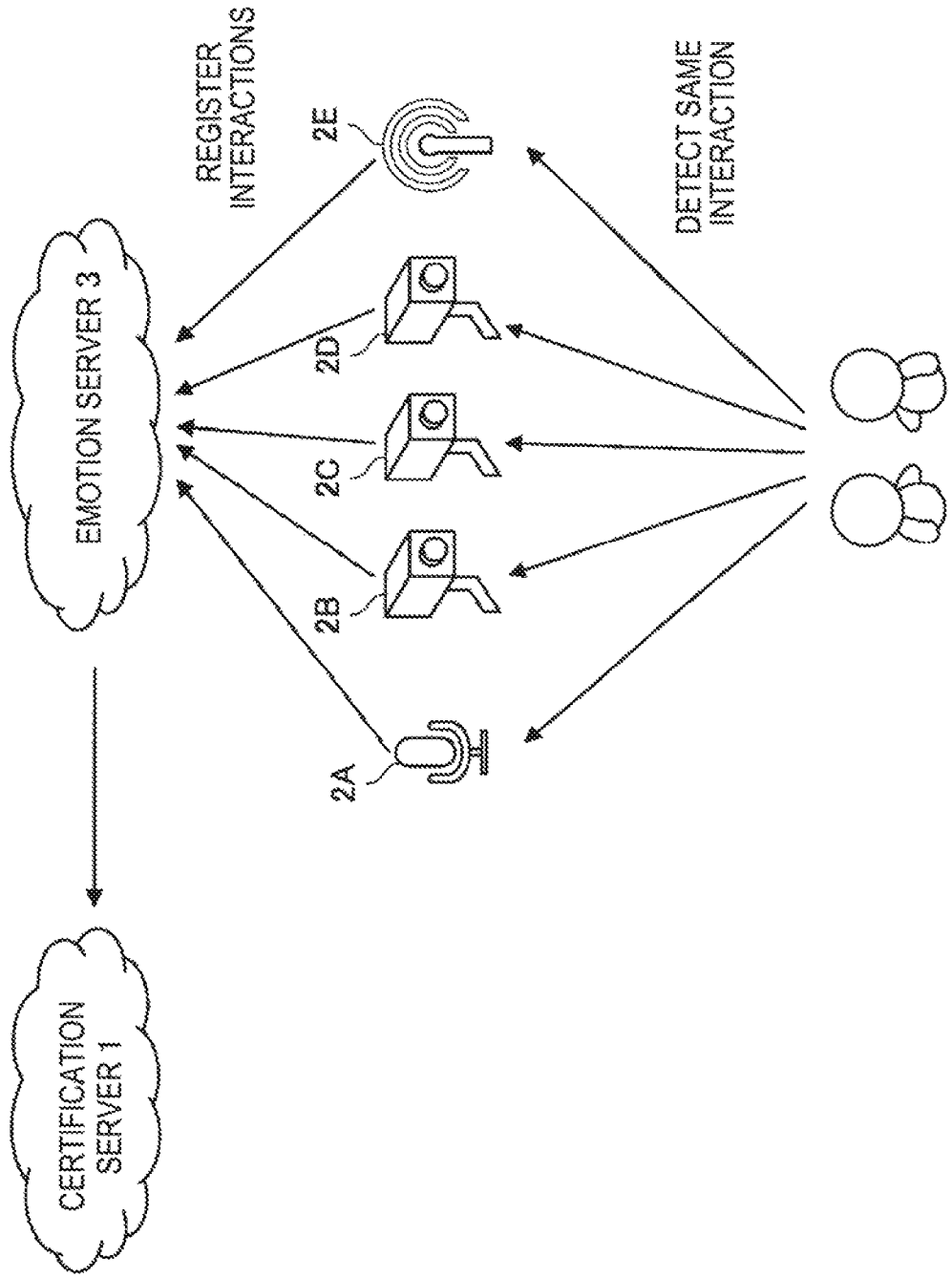
FIG. 11 is an explanatory diagram illustrating a case in which a plurality of sensing devices detect the same interaction.

Next, another certification process according to the embodiment will be described. FIG. 11 is an explanatory diagram illustrating a case in which a plurality of sensing devices 2A to 2E detect the same interaction. As illustrated in FIG. 11, for example, when a certain user talks with another user, conversation between the users is detected as an interaction at the same timing by the plurality of sensing devices 2A to 2E in the environment. The sensing device 2A detects an interaction by acquiring sound and analyzing the sound and the sensing devices 2B to 2D detects interactions by analyzing captured images. In addition, the sensing device 2E detects an interaction by analyzing a captured image, sound, biometric information (a heart rate, brain waves, body temperature, a pulse rate, an amount of perspiration, or the like) received from a wearable device worn by the user.

Then, since the sensing devices 2A to 2D transmit the detected interaction information to the emotion server 3, the emotion server 3 registers the interaction information in the emotion information DB 33 and the evaluation unit 30b calculates evaluation values of the interactions. At this time, the emotion server 3 compares the evaluation values of the interactions to each other. When there is a considerably different value, it can be determined that there is a problem in the sensing device 2 detecting the interaction, the certification server 1 is notified that there is a problem, and the certification can be amended by the certification server 1.

Figure 12:
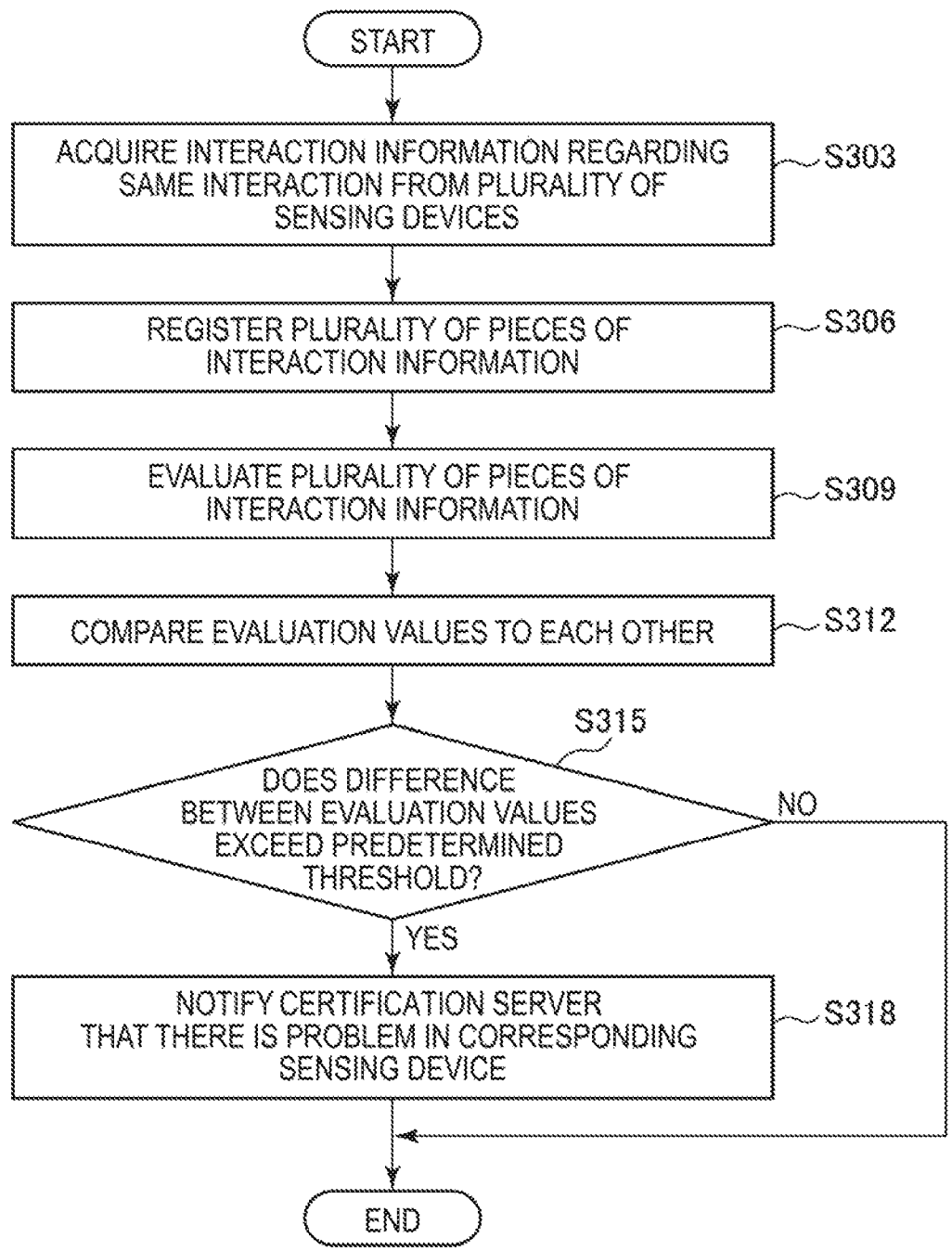
FIG. 12 is a flowchart illustrating a notification process according to the embodiment.

Hereinafter, a notification process based on the evaluation values by the emotion server 3 will be described specifically with reference to FIG. 12. FIG. 12 is a flowchart illustrating the notification process according to the embodiment.

As illustrated in FIG. 12, in step S303, the emotion server 3 first acquires the interaction information regarding the same interaction from the plurality of sensing devices 2.

Subsequently, in step S306, the interaction storage controller 30a of the emotion server 3 stores (registers) the plurality of pieces of interaction information regarding the same interaction in the emotion information DB 33.

Subsequently, in step S309, the evaluation unit 30b calculates the evaluation values of the plurality of pieces of interaction information.

Subsequently, in step S312, the controller 30 compares the evaluation values of the plurality of interaction information to each other. Specifically, the controller 30 extracts an evaluation value of a considerable numerical value among the evaluation values, that is, an evaluation value with which a difference from the other evaluation values of the plurality of evaluation values of the plurality of pieces of interaction information exceeds a predetermined threshold.

Subsequently, when the difference between the evaluation values exceeds the predetermined value ("Yes" in S315), the notification controller 30g performs control in step S318 such that the certification server 1 is notified that there is a problem in the sensing device 2 detecting the interaction information of the evaluation value in which there is a difference exceeding the predetermined threshold. Thus, in the certification server 1, the certification of the pointed sensing device 2 may be rejected or the property information regarding the pointed sensing device 2 may be acquired and the certification may be confirmed in comparison with the certification standard.

The notification process based on the evaluation value according to the embodiment has been described specifically above.

3-5. Approval Process

In the above-described embodiment, the certification of the sensing device 2 has been described. By certifying the sensing device 2 by the certification server 1, it is possible to maintain the reliability of the emotion value. Here, the operation process of the information processing system according to the embodiment is not limited to the above-described certification process. By registering the interaction information certified among the pieces of interaction information extracted by the sensing device 2 certified by the certification server 1 in the emotion server 3, it is also possible to improve the reliability of the emotion value.

For example, the sensing device 2 may also recognize a face expression of a user in addition to an interaction in which the user cleans a watch, as illustrated in FIG. 1, through image analysis. However, a certain user does not want an interaction of an emotion by a face expression in a life at his or her home to be registered in the emotion server 3. Accordingly, in the embodiment, control is enabled such that certified interaction information is registered in the emotion server 3. Hereinafter, the approval process will be described with reference to FIGS. 13 to 18.

3-5-1. Approval Process

Figure 13:
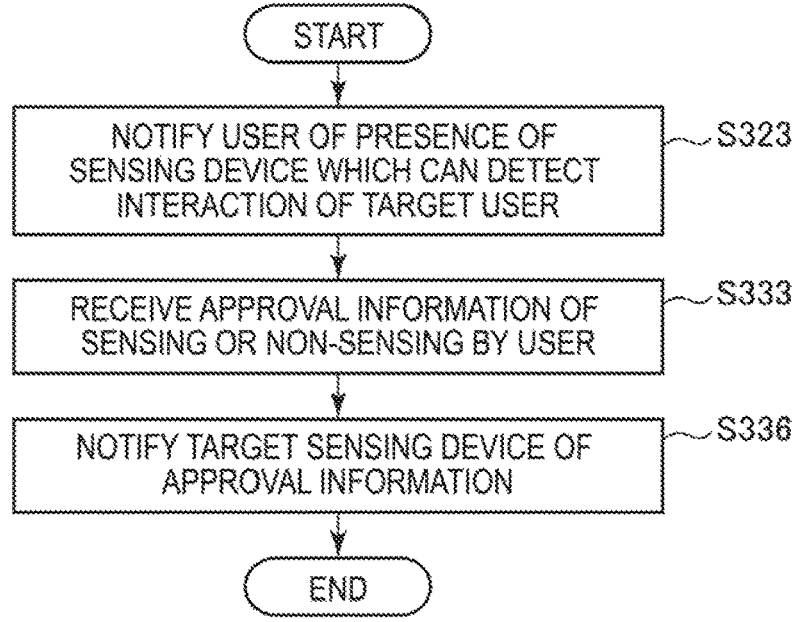
FIG. 13 is a flowchart illustrating an approval process according to the embodiment.

FIG. 13 is a flowchart illustrating the approval process according to the embodiment. As illustrated in FIG. 13, in step S323, the notification controller 30g of the emotion server 3 first notifies the user of presence of the sensing device 2 which can detect an interaction of a target user with reference to the certification information stored in the certification information DB 34. Specifically, the notification controller 30g notifies the user terminal 5 of presence of the sensing devices 2 which are the sensing device 2 worn by the user, the sensing device 2 installed at the home of the user, and the sensing device 2 carried to be loaded by the user and are the sensing devices 2 certified by the certification server 1. The emotion server 3 may perform the notification when the certification is performed by the certification server 1 and the certification information is transmitted or may perform the notification in accordance with access from the user terminal 5.

Subsequently, in step S333, the emotion server 3 receives approval information indicating sensing or non-sensing by the user. Specifically, the user performs approval setting of detection of an interaction between the user and another object by the notified sensing device 2 and the user terminal 5 transmits approval information indicating content of the approval setting to the emotion server 3.

Subsequently, in step S336, the controller 30 of the emotion server 3 stores the approval information received from the user terminal 5 in connection with the approval information of the corresponding sensing device 2 stored in the approval information DB 34 and transmits the approval information to the corresponding sensing device 2. The approval information includes an object ID of the target user setting the approval and the individual ID of the approved sensing device 2. The sensing device 2 detects an interaction of the target user when the interaction detection is approved by the user, and does not detect an interaction of the target user when the interaction detection is not approved. In addition, in the emotion server 3, the interaction storage controller 30a performs control such that the received interaction information is stored (registered) in the emotion information DB 33 in a case in which the registration is certified by the certification server 1 and is approved by the target user with reference to the certification information and the approval information stored in the certification information DB 34 when the received interaction information is stored (registered) in the emotion information DB 33.

The approval process of the sensing or the non-sensing by the user has been described specifically above. Thus, an interaction can be detected by the sensing device 2 approved by the user among the certified sensing devices 2 and the detected interaction information can be stored in the emotion server 3. Accordingly, for example, an interaction such as conversation may be detected. However, when the user does not want an interaction such as a face expression to be detected, registration of an interaction not desired by the user can be avoided by approving the sensing device 2 collecting sound and not approving the sensing device 2 acquiring a captured image.

In addition, the approval information may be managed by the emotion server 3 or may be managed by the certification server 1, as described above or a server managing the approval information may be separately installed.

3-5-2. Approval Setting in Each Place

In the above-described approval process, the approval of the sensing device 2 which is around the target user and detects the interaction of the user has been described, but the embodiment is not limited thereto. For example, interaction detection can also be approved temporarily to the sensing device 2 installed in a public place which the user does not usually visit. Thus, for example, in a conference room of a business office, a restaurant, an event site, or the like, a user entering that place can be notified of registration or non-registration of an interaction in that place and approval setting can be appropriately performed. Hereinafter, the description will be made specifically with reference to FIG. 14.

Figure 14:
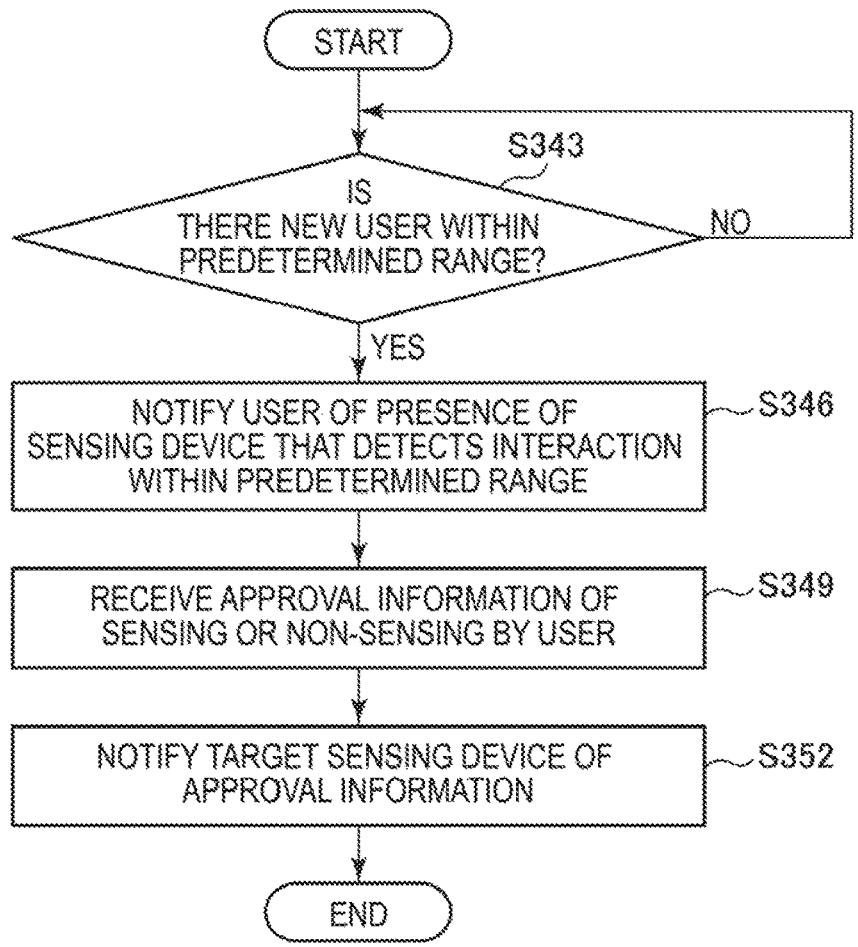
FIG. 14 is a flowchart illustrating an approval setting process in each place according to the embodiment.

FIG. 14 is a flowchart illustrating an approval setting process in each place according to the embodiment. As illustrated in FIG. 14, in step S343, the emotion server 3 first determines whether there is a new user within a predetermined range. The predetermined range is, for example, a public place such as a conference room of a business office, a restaurant, or an event site, as described above. The sensing device 2 which detects an interaction of an object within the predetermined range and is certified by the certification server 1 is installed in that place. When there is an approval of the user, the interaction information can be registered in the emotion server 3. For example, a human detection sensor (which may be the sensing device 2) installed at an entrance can also detect people going in and out and determine the presence of a new user on the basis of the detection result. Alternatively, the presence of a new user may also be determined on the basis of positional information of the user terminal 5 and installation place information of the sensing device 2 installed in a public place. The installation place information of the sensing device 2 is included in the certification information stored in the certification information DB 34. In addition, the sensing device 2 installed in a public place may ascertain the presence of a new user by acquiring user identification information (for example, an object ID) from the user terminal 5 or may ascertain the presence of a new user by imaging the face of the user and recognizing a face image.

Subsequently, in step S346, the notification controller 30g of the emotion server 3 notifies the user of presence of the certified sensing device 2 detecting an interaction within the predetermined range. Specifically, the notification controller 30g notifies the user terminal 5 of the user entering the predetermined range of the presence of the sensing device 2.

Subsequently, in step S349, the emotion server 3 receives the approval information of the sensing or non-sensing by the user. Specifically, the user uses the user terminal 5 to perform approval setting of whether an interaction between the user and another object may be detected within the predetermined range, and then the user terminal 5 transmits input approval information to the emotion server 3.

Then, in step S352, the controller 30 of the emotion server 3 stores the approval information received from the user terminal 5 in connection with the certification information of the corresponding sensing device 2 stored in the certification information DB 34 and transmits the approval information to the corresponding sensing device 2. The sensing device 2 detects an interaction of the target user when the sensing device 2 is approved by the user, and does not detect an interaction of the target user when the sensing device 2 is not approved. In addition, in the emotion server 3, the interaction storage controller 30a performs control such that the received interaction information is stored (registered) in the emotion information DB 33 in a case in which the registration is certified by the certification server 1 and is approved by the target user with reference to the certification information and the approval information stored in the certification information DB 34 when the received interaction information is stored (registered) in the emotion information DB 33.

Thus, the user can approve the detection of the interaction by the certified sensing device 2 which can detect an interaction within the predetermined range in a public place or the like at that place.

3-5-3. Automatic Approval Setting of Surrounding Sensing Device

In the above-described approval setting process in each place, the user performs the approval setting of the sensing device 2. However, when there are many sensing devices 2 around the user, it takes some time for the user to perform the approval setting in each of the sensing devices and thus there is a burden on the user. Accordingly, the sensing devices 2 around the user may be automatically approved on the basis of positional information of the user. Hereinafter, the automatic approval setting will be described with reference to FIG. 15.

Figure 15:
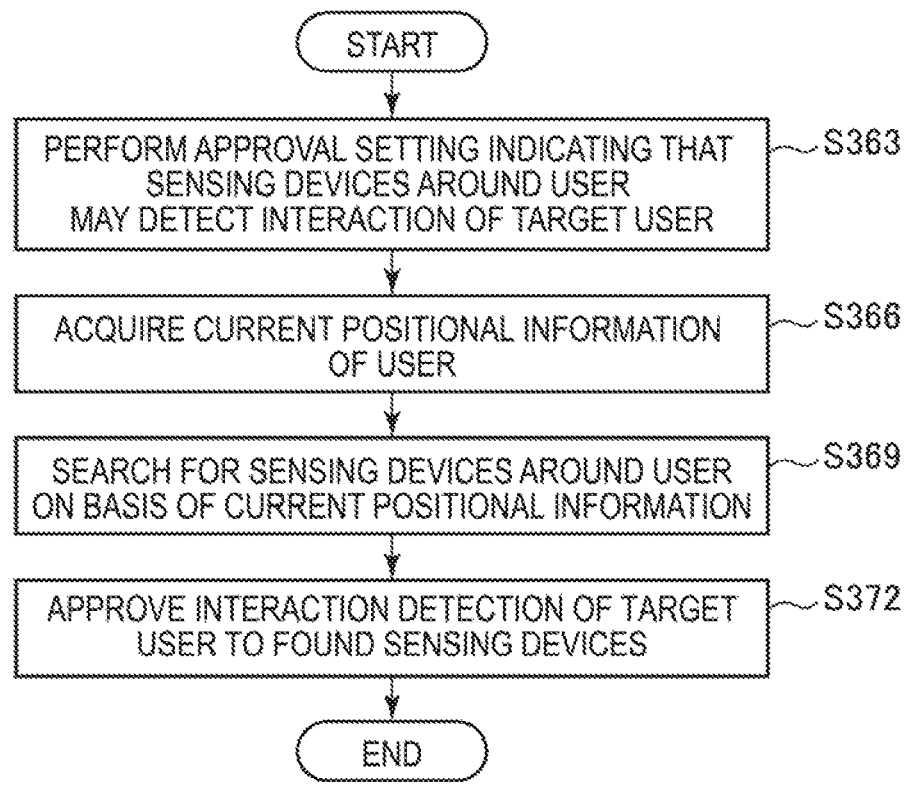
FIG. 15 is a flowchart illustrating an automatic approval setting process for surrounding sensing devices according to the embodiment.

FIG. 15 is a flowchart illustrating an automatic approval setting process for surrounding sensing devices according to the embodiment. As illustrated in FIG. 15, in step S363, the approval setting unit 30h of the emotion server 3 first performs approval setting indicating that the sensing devices 2 around the user may detect an interaction of a target user. The approval setting may be performed in accordance with an instruction from the target user. In addition, the set approval information includes an object ID of the target user and the individual ID of the sensing device 2 worn by the user.

Subsequently, in step S366, the emotion server 3 acquires current positional information of the user. Specifically, the emotion server 3 acquires current positional information of the user terminal 5 measured by a position measurement unit such as a GPS installed in the user terminal 5 from the user terminal 5.

Subsequently, in step S369, the approval setting unit 30h of the emotion server 3 searches for one or more sensing devices 2 around the user on the basis of the current positional information. Specifically, the approval setting unit 30h searches for the certified sensing devices 2 around the user with reference to the installation positional information of the sensing devices 2 included in the certification information stored in the certification information DB 34.

Then, in step S372, the approval setting unit 30h approves the detection of an interaction of the target user to the one or more found sensing devices 2. Specifically, the approval setting unit 30h generates approval information indicating approval of the interaction detection of the target user to the one or more found sensing devices 2 and stores the approval information in the approval information DB 34. In addition, the notification controller 30g may notify the corresponding sensing device 2 of the generated approval information.

The automatic approval setting process for the surrounding sensing devices 2 according to the embodiment has been described above. In this way, by performing the setting indicating the approval of the sensing devices 2 around the user in advance, it is possible to perform the approval setting on one or more sensing devices 2 automatically in accordance with the current position of the user, and thus it is possible to omit the trouble of the user.

3-5-4. Operation Process of Sensing Device 2 in Accordance with Approval Setting Next, a process of interaction detection in each sensing device 2 when the above-described approval setting is performed will be described with reference to FIG. 16. FIG.

16 is a flowchart illustrating an operation process of the sensing device 2 in accordance with the approval setting according to the embodiment.

Figure 16:
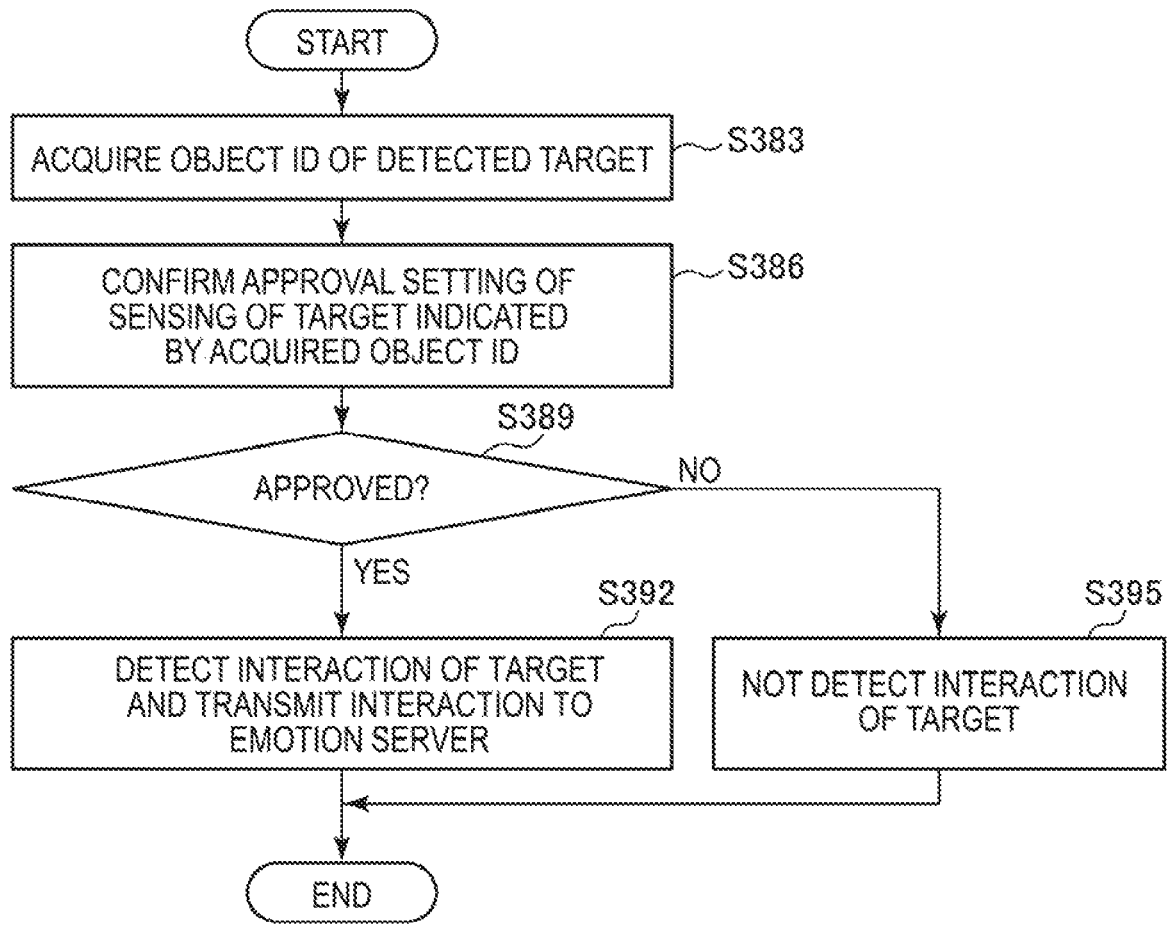
FIG. 16 is a flowchart illustrating an operation process of the sensing device in accordance with approval setting according to the embodiment.

As illustrated in FIG. 16, in step S383, the sensing device 2 first acquires the object ID of a target (an article or a person) detected by the sensor 21. Specifically, for example, the sensing device 2 may inquire of the emotion server 3 on the basis of sound analysis or analysis of a captured image obtained by imaging the target and may acquire the corresponding object ID managed in the object DB 32. In addition, the sensing device 2 may acquire the object ID from the target (for example, the user terminal 5 carried by the target user).

Subsequently, in step S386, the sensing device 2 confirms approval setting of sensing of the target indicated by the acquired object ID in the emotion server 3. Specifically, for example, the sensing device 2 designates the object ID and the individual ID of the sensing device 2, inquires of the emotion server 3, and acquires the corresponding approval information stored in the certification information DB 34. The sensing device 2 confirms whether detection of an interaction of the target is approved with reference to the approval information.

Subsequently, when the detection of the interaction is approved ("Yes" in S389), the sensing device 2 detects the interaction of the target and transmits the interaction of the target to the emotion server 3 in step S392.

Conversely, when the detection of the interaction is not approved ("No" in S389), the sensing device 2 does not detect the interaction of the target in step S395.

The operation process of the sensing device 2 in accordance with the approval setting according to the embodiment has been described specifically above.

3-5-5. Supplement

In the automatic approval setting of the surrounding sensing devices 2 around the user, as described above with reference to FIG. 15, the approval setting is automatically performed on one or more sensing devises 2 around the user on the basis of the positional information of the user and the interaction information is registered. However, the embodiment is not limited thereto. When the surrounding sensing devices 2 is approved and then a given condition is satisfied, control may be performed such that interaction information from the surrounding sensing devices 2 is registered (stored in the emotion information DB 33).

Figure 17:
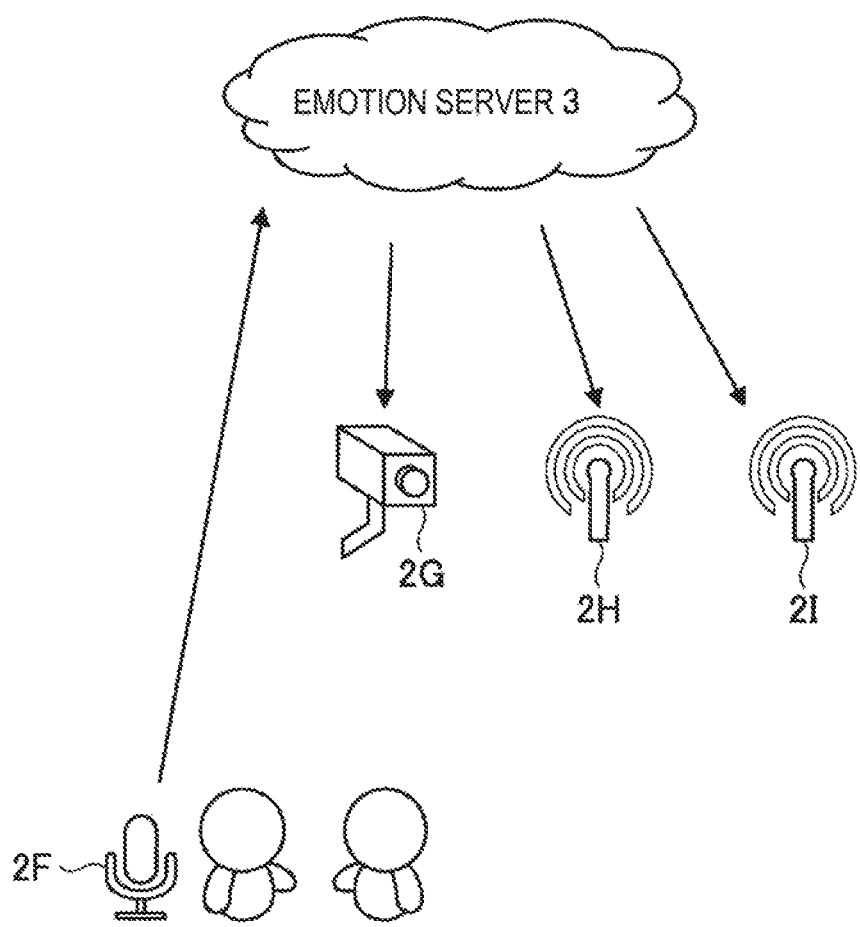
FIG. 17 is an explanatory diagram illustrating registration of interaction information from surrounding sensing devices when a given condition is satisfied according to the embodiment.

FIG. 17 is an explanatory diagram illustrating registration of interaction information from surrounding sensing devices when a given condition is satisfied according to the embodiment. As illustrated in FIG. 17, for example, a sensing device 2F which is worn by the user and can recognize sound transmits current positional information to the emotion server 3. The approval setting unit 30h of the emotion server 3 searches for other sensing devices 2G 2H, and 2I around the user on the basis of the current positional information of the user and approves detection of an interaction of the user in regard to the found sensing devices 2.

Subsequently, when a conversation interaction of the user is detected by the sensing device 2F and the user continues conversation with another person for a predetermined time, the emotion server 3 registers the interaction information transmitted from the surrounding sensing devices 2G to 2I. Conversely, when the sensing device 2F does not detect the conversation interaction of the user, the emotion server 3 discards the interaction information transmitted from the surrounding sensing devices 2G to 2I and does not perform the registration. In this way, in the embodiment, when detection of the interaction information by the surrounding sensing devices 2G to 2I is approved and then the registration of the interaction information from the surrounding sensing devices 2 is approved in accordance with, for example, a given condition that the interaction is detected by the sensing device 2 worn by the user. Hereinafter, the registration approval process will be described specifically with reference to FIG. 18.

Figure 18:
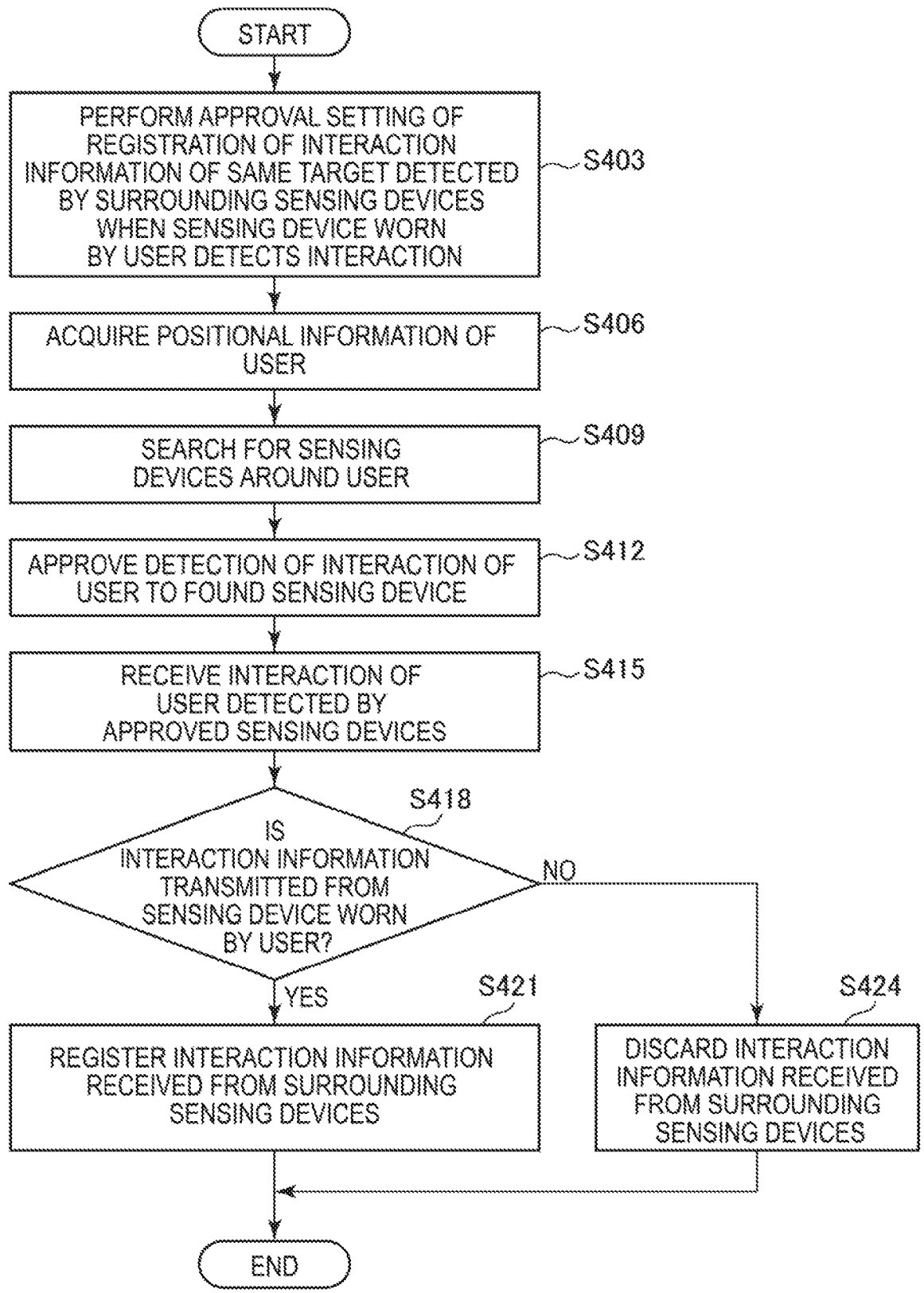
FIG. 18 is a flowchart illustrating a registration approval process according to the embodiment.

FIG. 18 is a flowchart illustrating the registration approval process according to the embodiment. As illustrated in FIG. 18, in step S403, the approval setting unit 30h of the emotion server 3 first performs approval setting of registration of interaction information of a user detected by surrounding sensing devices in advance when the sensing device worn by the user (who is an example of a target including a person or an article) detects the interaction. The approval setting may be performed in accordance with an instruction from the user, for example. In addition, the set approval information includes an object ID of the target user and an individual ID of the sensing device worn by the user.

Subsequently, in step S406, the emotion server 3 acquires current positional information of the user.

Subsequently, in step S409, the approval setting unit 30h of the emotion server 3 searches for one or more sensing devices 2 around the user on the basis of the current positional information. Specifically, the approval setting unit 30h searches for the certified sensing devices 2G to 2I around the user with reference to the installation positional information of the sensing devices 2 included in the certification information stored in the certification information DB 34.

Subsequently, in step S412, the approval setting unit 30h approves detection of an interaction of the target user in regard to the found sensing devices 2G to 2I.

Subsequently, in step S415, the emotion server 3 receives the interaction information of the user detected by the approved sensing devices 2G to 2I around the user.

Subsequently, in step S418, the interaction storage controller 30a of the emotion server 3 determines whether the sensing device 2F worn by the user detects an interaction and the interaction information is transmitted to the emotion server 3. Here, for example, it is determined whether a conversation interaction between the user and another user is detected for a given time and is transmitted as interaction information.

Then, when the sensing device 2F worn by the user transmits the interaction information ("Yes" in S418), the interaction storage controller 30a of the emotion server 3 performs control such that the interaction information received from the surrounding sensing devices 2G to 2I is registered in the emotion information DB 33 in step S421.

Conversely, when the sensing device 2F worn by the user does not transmit the interaction information ("No" in S418), the interaction storage controller 30a of the emotion server 3 discards the interaction information received from the surrounding sensing devices 2G to 2I and does not perform the registration in step S424.

The registration approval process for the interaction information from the sensing devices 2 around the target has been described above as the supplement of the approval process according to the embodiment.

3-6. Access Approval Process

The above-described certification process and approval process are processes related to a stage in which the interaction information is registered in the emotion server 3, and the maintenance of the reliability of the database constructed in the emotion server 3 is realized through the processes.

Here, an interaction evaluation value is assigned to the interaction information registered in the emotion server 3 by the above-described evaluation value 30b and an emotion value is calculated on the basis of the evaluation value by the emotion value calculation unit 30e. Specifically, the emotion server 3 calculates an emotion value of an object ID designated from an external device and outputs the emotion value to the external device. In addition, the emotion server 3 outputs the interaction information or the evaluation value of the object ID designated by an external device to the external device and the external device calculates the emotion value in some cases.

The external device can use the acquired emotion value in various information processing systems. For example, the emotion value can also be used in an environment adjustment system that causes a moving target user to follow a moving object and causes the moving object to locally change a surrounding environment in accordance with the emotion of the target user. The environment adjustment system will be described specifically with reference to FIG. 19.

Figure 19:
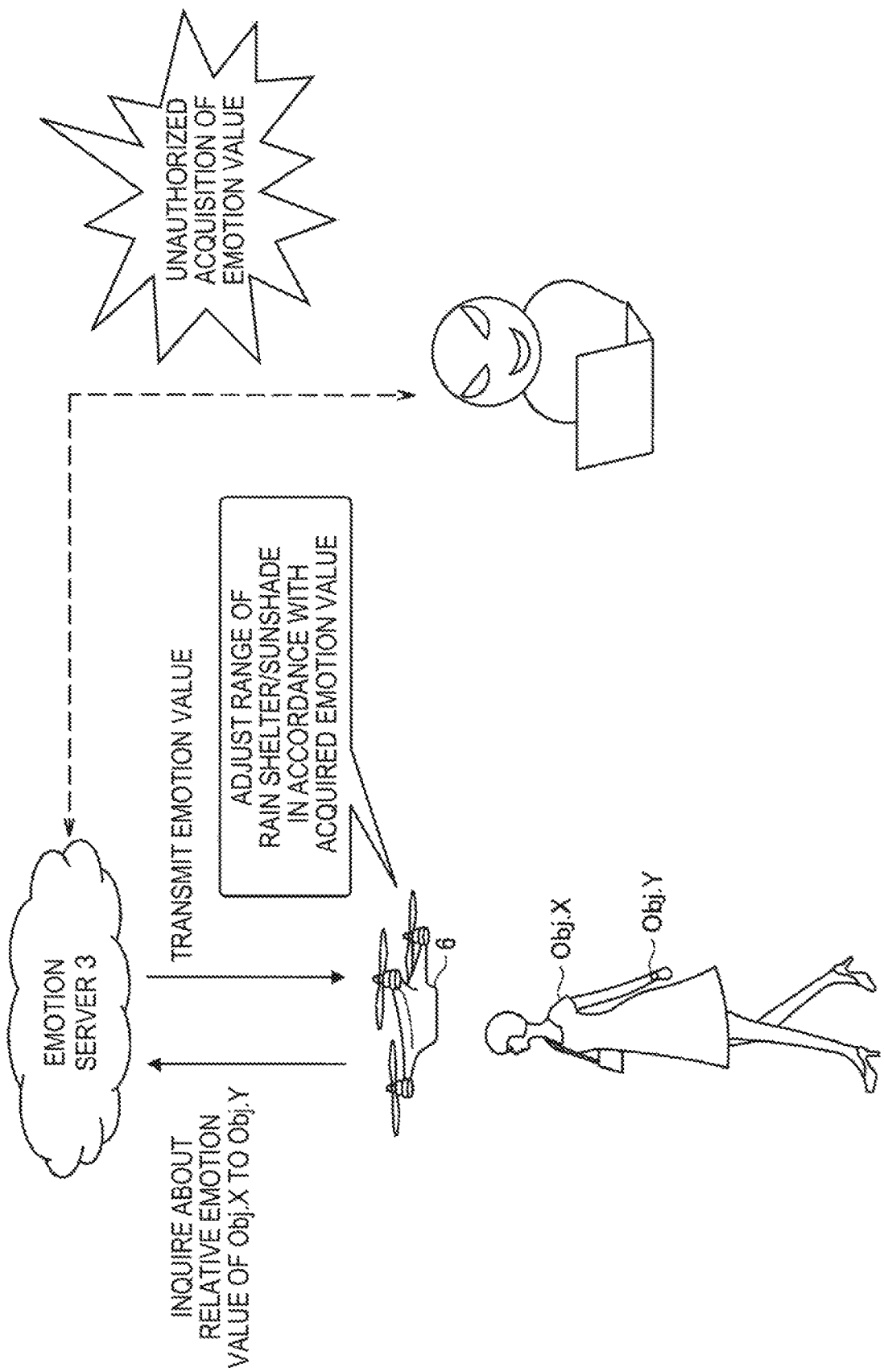
FIG. 19 is an explanatory diagram illustrating an environment adjustment system in which an emotion value is used according to the embodiment.

FIG. 19 is an explanatory diagram illustrating an environment adjustment system in which an emotion value is used according to the embodiment. As illustrated in FIG. 19, a moving object 6 is a small-sized unmanned flying object that follows a target user Obj.X (who is an example of an object) and moves and can locally change a surrounding environment in accordance with an emotion of the target user. Specifically, when the target user has an unpleasant emotion against rain, the moving object 6 functions as a rain shelter while flying above the target user so that the target user does not get wet with the rain. When the target user has an unpleasant emotion to direct sunlight exposure or sunburn, the moving object 6 similarly functions as a sunshade.

In addition, the moving object 6 analyzes a captured image of the target user captured by a loaded camera, recognizes the target user Obj.X and a watch Obj.Y (which is an example of an object) worn by the target user Obj.X, and inquires of the emotion server 3 about a relative emotion value of the user Obj.X to the watch Obj.Y. The emotion value calculation unit 30e of the emotion server 3 calculates the relative emotion value of the user Obj.X to the watch Obj.Y on the basis of an evaluation value of a previous interaction occurring between the user Obj.X and the watch Obj.Y. In the emotion server 3, a mood of the target user valuing the watch is calculated as an emotion value, for example, on the basis of evaluation values of interactions "frequent maintenance" and "safekeeping in a dedicated case" in regard to the watch Obj.Y carried by the target user Obj.X.

Then, when the relative emotion value of the user Obj.X to the watch Obj.Y is acquired from the emotion server 3, the moving object 6 performs control such that a coverage range of the rain shelter/the sunshade by the moving object 6 is expanded or the target user is covered more preferentially than the watch in accordance with the emotion value (the degree of valuing) of the target user to the watch. Also, in the example illustrated in FIG. 19, the moving object 6 directly requests the emotion server 3 to acquire the emotion value, but the environment adjustment system is not limited thereto. An environment control server (not illustrated) controlling the moving object 6 may request the emotion server 3 to acquire the emotion value. In this case, the environment control server performs object recognition based on analysis of a captured image, or flying control of the moving object 6 or environment adjustment control by the moving object 6.

In this way, the emotion server 3 outputs the emotion value (or an interaction evaluation value) of a designated object in accordance with access from the moving object 6 or an external device such as an environment control server controlling the moving object 6. However, as illustrated in FIG. 19, it is necessary to prevent an unauthorized third person from acquiring the emotion value (or an interaction evaluation value) of the target user by unauthorized access to the emotion server 3.

Accordingly, in the embodiment, by performing control such that the emotion server 3 outputs an emotion value (or an interaction evaluation value) of a target user only in a case of access from an external device that has predetermined authority, it is possible to further improve the reliability of the emotion server 3. Hereinafter, an operation process according to the embodiment will be described with reference to FIG. 20.

3-6-1. Access Permission Process

Figure 20:
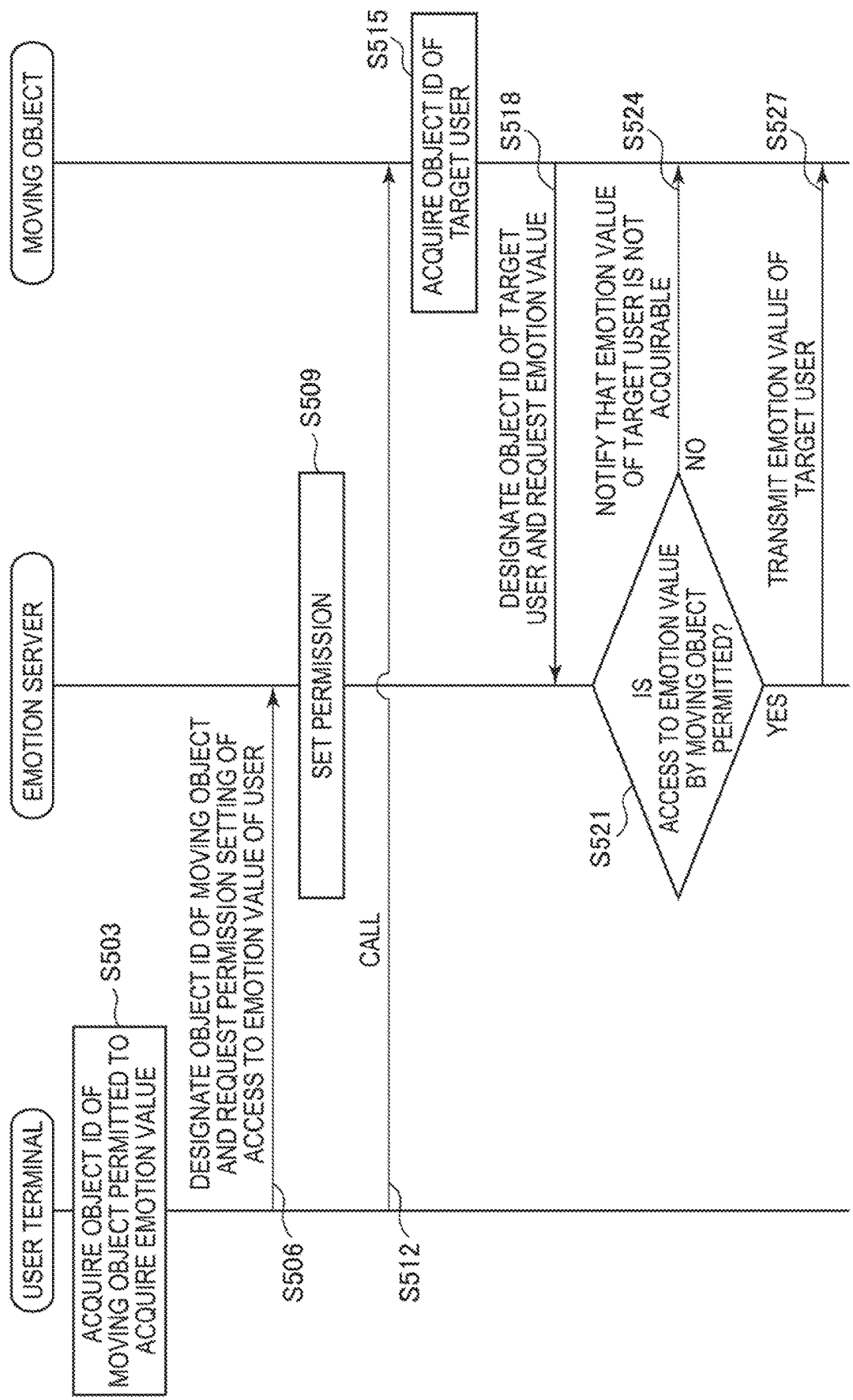
FIG. 20 is a sequence diagram illustrating an access permission process according to the embodiment.

FIG. 20 is a sequence diagram illustrating an access permission process according to the embodiment. Here, a case in which a user calls the moving object 6 to use the moving object 6 as a rain shelter will be assumed.

As illustrated in FIG. 20, in step S503, the user first acquires the object ID of the moving object 6 permitted to acquire the emotion value using the user terminal 5.

Subsequently, in step S506, the user terminal 5 designates the object ID of the moving object 6 and requests the emotion server 3 to set permission of access to the emotion value of the user.

Subsequently, in step S509, the access permission setting unit 30i of the emotion server 3 performs permission setting in accordance with the request from the user terminal 5. Specifically, the access permission setting unit 30i generates permission information indicating permission of access to information such as the interaction information, the evaluation value, and the emotion value of the user from the designated object ID and stores the permission information in the permission information DB 35. In this way, in the embodiment, the user sets the access permission in advance in the moving object 6.

Subsequently, in step S512, the user calls the moving object 6 using the user terminal 5.

Subsequently, in step S515, the moving object 6 called from the user acquires the object ID of the target user who is a calling subject. The object ID of the target user may be transmitted from the user terminal 5 when the moving object 6 is called (S512).

Subsequently, in step S518, the moving object 6 designates the object ID of the target user and requests the emotion value of the target user. In addition, when belongings worn by the target user is recognized, the moving object 6 may also request a relative emotion value of the target user to an object ID of the belongings together.

Subsequently, in step S521, referring to the permission information DB 35, the controller 30 of the emotion server 3 confirms whether the access to the emotion value of the target user by the moving object 6 is permitted. Specifically, referring to the permission information, the controller 30 determines whether the access to the target user is permitted on the basis of the object ID of the moving object 6.

Subsequently, when the access is not permitted ("No" in S521), the emotion server 3 notifies the moving object 6 that the emotion value of the target user is not acquirable in step S524.

Conversely, when the access is permitted ("Yes" in S521), the emotion server 3 transmits the emotion value of the target user to the moving object 6 in step S527.

As described above, by setting the emotion server 3 so that the access to the emotion value of the user is permitted in advance to the moving object 6 (which is an example of an external device), it is possible to prevent the emotion value from being acquired by the access by an unauthorized third person.

3-6-2. Modification Example

In the above-described access permission process, the user permits a specific external device to acquire the emotion value of the user, but the emotion vale permitted to be acquired may be limited. For example, when the emotion value is used in the environment adjustment system, it is possible to realize control of a coverage range of a rain shelter/sunshade as long as the moving object 6 can acquire relative emotion values of the target user to objects (belongings worn by the target user or peoples staying together) around the target user. Accordingly, by permitting another access permission process according to the embodiment only to access to the relative emotion values of the user to objects around the user, it is possible to avoid outputting an unnecessary emotion value. Hereinafter, the access permission process will be described with reference to FIG. 21.

FIG. 21 is a sequence diagram illustrating another access approval process according to the embodiment. Also, in steps illustrated in FIG. 21, the same reference numerals are given to the same steps as the access permission process described with reference to FIG. 20.

As illustrated in FIG. 21, in step S503, the user first acquires the object ID of the moving object 6 permitted to acquire the emotion value using the user terminal 5.

Subsequently, in step S507, the user terminal 5 designates the object ID of the moving object 6 and requests the emotion server 3 to set permission of access to specific emotion values of the user by the moving object 6. Specifically, the user terminal 5 requests the emotion server 3 to set the permission of access to only the relative emotion values of the user to the objects (belongings worn by the target user or people staying together) around the user.

Subsequently, in step S509, the access permission setting unit 30i of the emotion server 3 performs the permission setting in accordance with the request from the user terminal 5.

Subsequently, in step S512, the user calls the moving object 6 using the user terminal 5.

Subsequently, in step S515, the moving object 6 called from the user acquires the object ID of the target user which is a calling subject.

Subsequently, in step S516, the moving object 6 acquires the object ID of an object around the target user, for example, the watch Obj.Y worn by the user Obj.X, as illustrated in FIG. 19.

Subsequently, in step S519, the moving object 6 designates the object ID of the target user Obj.X and requests the relative emotion value of the user to the watch Obj.Y (which is specified with the object ID of the watch Obj.Y and also referred to as the object Y below).

Subsequently, in step S521, referring to the permission information DB 35, the controller 30 of the emotion server 3 confirms whether the access to the emotion value of the target user by the moving object 6 is permitted.

Subsequently, when the access is not permitted ("No" in S521), the emotion server 3 notifies the moving object 6 that the emotion value of the target user is not acquirable in step S524.

Conversely, when the access is permitted ("Yes" in S521), the controller 30 of the emotion server 3 confirms whether the access to the specific emotion values of the target user by the moving object 6, that is, the relative emotion values to the objects around the target user, is permitted, referring to the permission information DB 35, in step S525.

Subsequently, when the access is not permitted ("No" in S525), the emotion server 3 notifies the moving object 6 that the emotion value of the target user is not acquirable in step S528.

Conversely, when the access is permitted ("Yes" in S525), the controller 30 of the emotion server 3 confirms whether the object Y is around the target user in step S531. For example, the controller 30 can confirm whether the object Y is around the target user on the basis of a captured image of the target user transmitted from the moving object 6. Alternatively, the controller 30 may confirm whether the object Y is around the target user referring to positional information acquired by a position measurement unit loaded on the object Y and positional information transmitted from the user terminal 5.

Subsequently, when there is no object Y around the target user ("No" in S531), the emotion server 3 notifies the moving object 6 in step S534 that the emotion value of the target user is not acquirable.

Conversely, when the object Y is around the target user ("Yes" in S531), the emotion server 3 transmits the relative emotion value of the target user to the object Y to the moving object 6 in step S537.

4. CONCLUSION

As described above, in the information processing system according to the embodiment of the present disclosure, it is possible to maintain the reliability of the database constructed in the emotion server 3. In the database, the interaction evaluation value for calculating the emotion value is stored in connection with the interaction information. By maintaining the reliability of the interaction information registered in the database, it is possible to consequently the reliability of the evaluation value and the calculated emotion value and maintain the reliability of the entire system.

Specifically, for example, by including the certification server 1 that certifies the sensing device 2 detecting the interaction information registered in the emotion server 3 in the system, it is possible to prevent registration of incorrect interaction information due to an erroneous operation of the sensing device 2 and maintain the reliability of the emotion value. The sensing device 2 can be certified on the basis of feedback of the evaluation to the sensing device 2, for example, by notifying the user of the registered interaction information and confirming whether the interaction of the user is correctly detected. In addition, the sensing device 2 can be certified on the basis of whether the performance of the sensing device 2 (individual) satisfies the certification standard at the time of installation or delivery.

In addition, by performing control such that the interaction information approved for each object ID, each type of interaction, or each place among the pieces of interaction information detected by the certified sensing device 2 is registered in the emotion server 3, it is possible to improve the reliability of the emotion server 3.

In addition, by preventing unauthorized access to the emotion server 3 by a third person, it is possible to further improve the reliability of the emotion server 3.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to generate a computer program causing the hardware such as the CPU, the ROM, and the RAM contained in the certification server 1, the sensing device 2, the emotion server 3, or the user terminal 5 described above to function as the certification server 1, the sensing device 2, the emotion server 3, or the user terminal 5. In addition, a computer-readable storage medium storing the computer program is also provided.

In the example illustrated in FIG. 2, the certification server 1 and the emotion server 3 have been described as separate servers, but the information processing system according to the embodiment is not limited thereto. The certification server 1 and the emotion server 3 may also be realized by one information processing device.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing system including:

a communication unit configured to acquire information related to an interaction between objects from a sensing device that detects the interaction between the objects;

an emotion information database constructed by accumulating an evaluation value used when an emotion value of each object generated on the basis of the information related to the interaction between the objects is calculated;

a certification unit configured to certify the sensing device that detects the interaction between the objects and issue certification information to the sensing device; and an authentication unit configured to authenticate the information related to the interaction transmitted from the sensing device on the basis of the certification information issued to the sensing device.

(2)

The information processing system according to (1), in which the information related to the interaction authenticated by the authentication unit and the evaluation value corresponding to the interaction are accumulated in the emotion information database.

(3)

The information processing system according to (1) or (2), further including:

a notification controller configured to perform control such that a user related to the interaction is notified of the information related to the interaction between the objects detected by a specific sensing device via the communication unit, in which the certification unit updates certification information regarding the specific sensing device in accordance with user feedback on the information related to the interaction.

(4)

The information processing system according to (1) or (2), further including:

a notification controller configured to perform control such that evaluation values corresponding to a plurality of interactions are compared to each other when the same interaction is detected by the plurality of sensing devices, the sensing device that detects an interaction to which an evaluation value deviating by a predetermined threshold or more is assigned is specified, and the certification unit is notified of the sensing device, in which the certification unit updates the certification information regarding the specified sensing device.

(5)

The information processing system according to any one of (1) to (4), further including: an approval setting unit configured to approve interaction detection or accumulation of the information related to the interaction in the emotion information database.

(6)

The information processing system according to (5), in which the approval setting unit sets approval of the interaction detection or the accumulation for each object ID or type of interaction.

(7)

The information processing system according to (5) or (6), in which the approval setting unit performs setting such that the interaction detection of a specific user is approved in the sensing device considered to be detectable on the basis of a response of detection or non-detection by the specific user.

(8)

The information processing system according to any one of (5) to (7), in which the approval setting unit performs setting such that the interaction detection of a specific user within a predetermined range is approved on the basis of a response of detection or non-detection by the specific user located within the predetermined range.

(9)

The information processing system according to any one of (5) to (8), in which the approval setting unit performs setting such that the interaction detection of a specific user is automatically approved in one or more sensing devices disposed around the specific user on the basis of positional information of the specific user.

(10)

The information processing system according to any one of (5) to (9), in which the approval setting unit performs setting such that the interaction detection of a specific user is automatically approved in one or more sensing devices disposed around the specific user when the interaction detection is performed by a specific sensing device worn by the specific user.

(11)

The information processing system according to any one of (1) to (10), further including:

a permission setting unit configured to permit acquisition of an emotion value of a specific user with respect to an object around the specific user.

(12)

An information processing device including:

an extraction unit configured to extract information related to an interaction between objects detected by a sensor in connection with each object;

a communication unit configured to transmit information regarding the sensor and the information related to the interaction detected by the sensor to a server including an emotion information database constructed by accumulating an evaluation value used when an emotion value of each object generated on the basis of the information related to the interaction between the objects is calculated; and a certification information storage unit configured to receive certification information indicating a result obtained when the server certifies an information processing device including the sensor on the basis of the information related to the interaction detected by the sensor via the communication unit, and store the certification information.

(13)

The information processing device according to (12), in which in a case where the server certifies the transmission of the information related to the interaction between the objects to the server, the information processing device detects the interaction using the sensor in accordance with the certification information received from the server.

(14)

The information processing device according to (12) or (13), in which the communication unit receives approval information for approving interaction detection of a specific object with respect to one or more information processing devices disposed around the information processing device from the server, and the information processing device detects interaction of the specific object using the sensor in accordance with the approval information received from the server.

(15)

A control method including:

acquiring information related to an interaction between objects from a sensing device that detects the interaction between the objects;

constructing an emotion information database by accumulating an evaluation value used when an emotion value of each object generated on the basis of the information related to the interaction between the objects is calculated;

certifying, by a certification unit, the sensing device that detects the interaction between the objects and issuing certification information to the sensing device; and authenticating, by an authentication unit, the information related to the interaction transmitted from the sensing device on the basis of the certification information issued to the sensing device.

(16)

A storage medium having a program stored therein, the program causing a computer to function as:

an extraction unit configured to extract information related to an interaction between objects detected by a sensor in connection with each object;

a communication unit configured to transmit information regarding the sensor and the information related to the interaction detected by the sensor to a server including an emotion information database constructed by accumulating an evaluation value used when an emotion value of each object generated on the basis of the information related to the interaction between the objects is calculated; and a certification information storage unit configured to receive certification information indicating a result obtained when the server certifies an information processing device including the sensor on the basis of the information related to the interaction detected by the sensor via the communication unit, and store the certification information.

REFERENCE SIGNS LIST 100 information processing system
1 certification server
11 communication unit
12 certification unit
13 certification information input unit
14 certification information DB
15 individual information DB
16 individual certification history DB
2 sensing device
21 sensor
22 interaction extraction unit
23 communication unit
24 certification information storage unit
3 emotion server
30 controller
30a interaction storage controller
30b evaluation unit
30c object management unit
30d related object search unit
30e emotion value calculation unit
30f authentication unit
30g notification controller
30h approval setting unit
30i access permission setting unit
31 communication unit
32 object DB
33 emotion information DB
34 certification information DB
35 permission information DB
4 network
5 user terminal
6 moving object

The invention claimed is:

1. An information processing system, comprising:
a communication unit configured to acquire information related to an interaction between a plurality of objects from a sensing device, wherein the sensing device detects the interaction between the plurality of objects;
an evaluation unit configured to calculate a first evaluation value of the interaction between the plurality of objects;
an emotion information database configured to accumulate the first evaluation vale;
an emotion value calculation unit configured to calculate an emotion value of each object of the plurality of objects based on the first evaluation value and the information related to the interaction between the plurality of objects;
a certification unit configured to:
certify the sensing device that detects the interaction between the plurality of objects, wherein the sensing device is certified based on first user feedback on the information related to the interaction; and
issue certification information to the sensing device based on the certification of the sensing device;
an authentication unit configured to authenticate the information related to the interaction, wherein the information is authenticated based on the certification information; and an approval setting unit configured to set an approval of the detection of the interaction between the plurality of objects for each of an object identification (ID) and a type of the interaction.

2. The information processing system according to claim 1, wherein the emotion information database is further configured to accumulate the information authenticated by the authentication unit.

3. The information processing system according to claim 1, further comprising a notification controller configured to notify, via the communication unit, the information related to the interaction between the plurality of objects to a user associated with the interaction,
wherein the certification unit is further configured to update the certification information regarding the sensing device based on second user feedback.

4. The information processing system according to claim 1, further comprising a notification controller configured to notify the certification unit regarding a specific sensing device of a plurality of sensing devices, wherein
the plurality of sensing devices detects a same interaction,
a second evaluation value corresponding to the specific sensing device deviates by at least a threshold value, and
the certification unit is further configured to update the certification information based on the specific sensing device.

5. The information processing system according to claim 1, wherein the approval setting unit is further configured to approve accumulation of the information related to the interaction in the emotion information database.

6. The information processing system according to claim 5, wherein the approval setting unit is further configured to set an approval of the accumulation of the information, related to the interaction, for at least one of the object ID or the type of the interaction.

7. The information processing system according to claim 5, wherein
the approval setting unit is further configured to approve the detection of the interaction of an object of the plurality of objects for the sensing device,
the object corresponds to a specific user, and
the detection of the interaction of the specific user is approved based on an approval operation of the specific user.

8. The information processing system according to claim 5, wherein
the approval setting unit is further configured to approve the detection of the interaction of an object of the plurality of objects within a specific location,
the object corresponds to a specific user, and
the detection of the interaction of the specific user within the specific location is approved based on an approval operation of the specific user.

9. The information processing system according to claim 5, wherein
the approval setting unit is further configured to set an automatic approval of the detection of the interaction of an object of the plurality of objects for at least one sensing device,
the object corresponds to a specific user,
the automatic approval of the detection of the interaction is based on positional information of the specific user, and
the at least one sensing device is within a proximity of the specific user.

10. The information processing system according to claim 5, wherein
the approval setting unit is further configured to set an automatic approval of the detection of the interaction of an object of the plurality of objects for at least one sensing device,
the object corresponds to a specific user,
the automatic approval of the detection of the interaction is based on the detection of the interaction by a specific sensing device wearable by the specific user, and
the at least one sensing device is within a proximity of the specific user.

11. The information processing system according to claim 1, further comprising a permission setting unit configured to permit acquisition of an emotion value of a specific user with respect to a specific object of the plurality of objects, wherein the specific object is within a proximity of the specific user.

12. A first information processing device, comprising:
a sensor configured to detect an interaction between a plurality of objects, wherein the sensor is connectable to each object of the plurality of objects;
an extraction unit configured to extract information related to the interaction between the plurality of objects;
a communication unit configured to transmit each of information of the sensor and the information related to the interaction to a server, wherein
the server includes:
an evaluation unit that calculates an evaluation value of the interaction between the plurality of objects,
an emotion information database that accumulates the evaluation value, and
an emotion value calculation unit that calculates an emotion value of each object of the plurality of objects based on the evaluation value and the information related to the interaction between the plurality of objects; and
a certification information storage unit configured to:
receive, via the communication unit, certification information indicating a result of certification of the first information processing device,
wherein the server certifies the first information processing device based on user feedback on the information related to the interaction; and
store the certification information, wherein
the communication unit is further configured to receive an approval of the detection of the interaction between the plurality of objects for each of an object identification (ID) and a type of the interaction.

13. The first information processing device according to claim 12, wherein in a case where the server certifies the transmission of the information related to the interaction, the sensor is further configured to detect the interaction between the plurality of objects based on the reception of the certification information from the server.

14. The first information processing device according to claim 12, wherein
the communication unit is further configured to receive, from the server, approval information corresponding to the detection of the interaction of a specific object of the plurality of objects,
the approval information is with respect to at least a second information processing device, the at least second information processing device is within a proximity of the first information processing device, and the sensor is further configured to detect the interaction of the specific object based on the approval information received from the server.

15. A control method, comprising:

in an information processing device:
- acquiring information related to an interaction between a plurality of objects from a sensing device, wherein the sensing device detects the interaction between the plurality of objects;
- calculating an evaluation value of the interaction between the plurality of objects;
- accumulating an evaluation value in an emotion information database;
- calculating an emotion value of each object of the plurality of objects based on the evaluation value and the information related to the interaction between the plurality of objects;
- certifying the sensing device that detects the interaction between the plurality of objects, wherein the sensing device is certified based on user feedback on the information related to the interaction;
- issuing certification information to the sensing device based on the certification of the sensing device;
- authenticating the information related to the interaction, wherein the information is authenticated based on the certification information; and
- setting an approval of the detection of the interaction between the plurality of objects for each of an object identification (ID) and a type of the interaction.

16. A non-transitory computer-readable medium having stored thereon computer-executable instructions, which when executed by a processor of an information processing device, cause the processor to execute operations, the operations comprising:
- detecting, by a sensor in the information processing device, an interaction between a plurality of objects;
- extracting information related to the interaction between the plurality of objects;
- transmitting each of information of the sensor and the information related to the interaction to a server, wherein
    the server includes:
    - an evaluation unit that calculates an evaluation value of the interaction between the plurality of objects,
    - an emotion information database that accumulates the evaluation value, and
    - an emotion value calculation unit that calculates an emotion value of each object of the plurality of objects based on the evaluation value and the information related to the interaction between the plurality of objects;
- receiving certification information indicating a result of certification of the information processing device, wherein
    the server certifies the information processing device based on user feedback on the information related to the interaction;
- storing the certification information; and
- receiving an approval of the detection of the interaction between the plurality of objects for each of an object identification (ID) and a type of the interaction.

* * * * *